Figure 1:
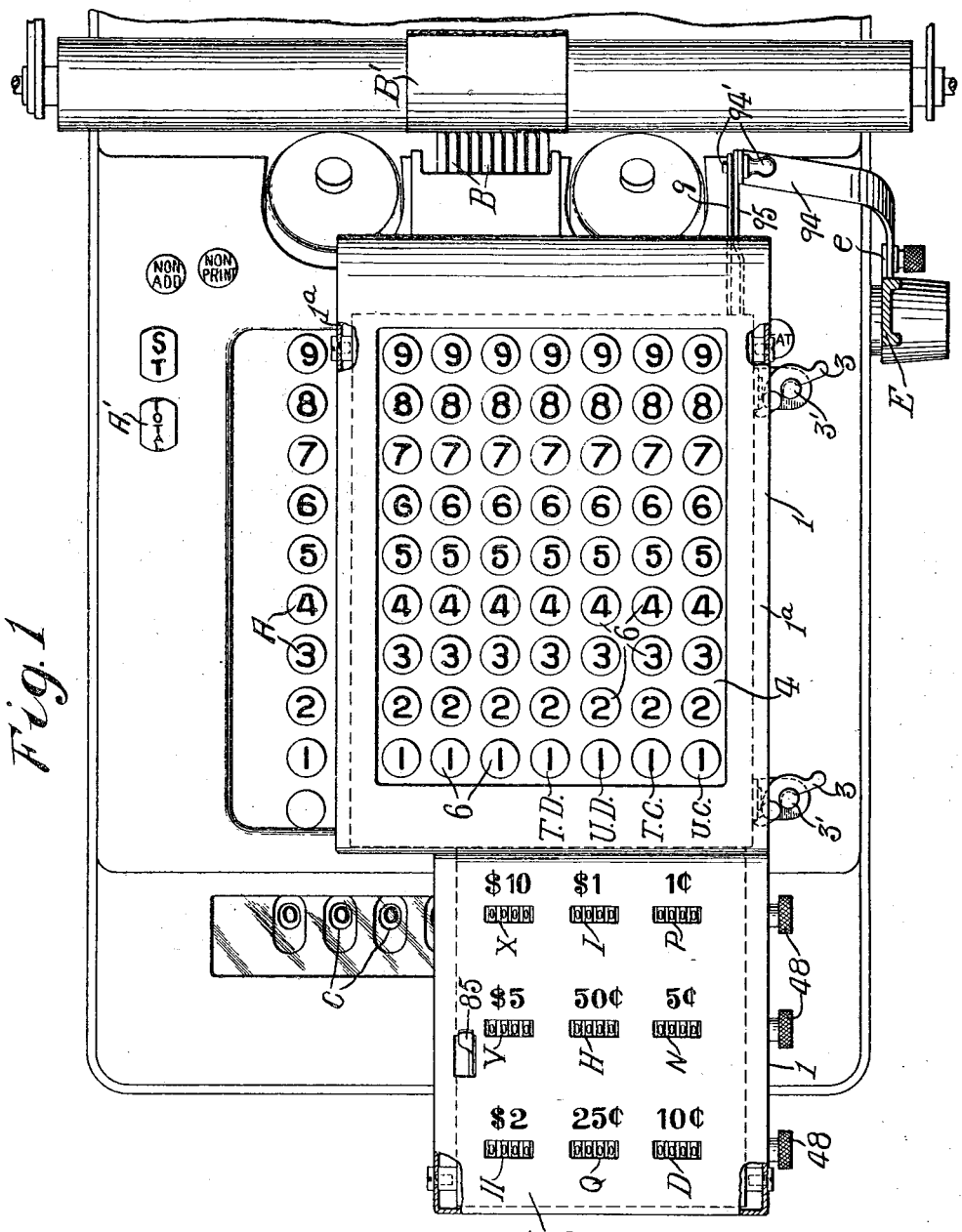

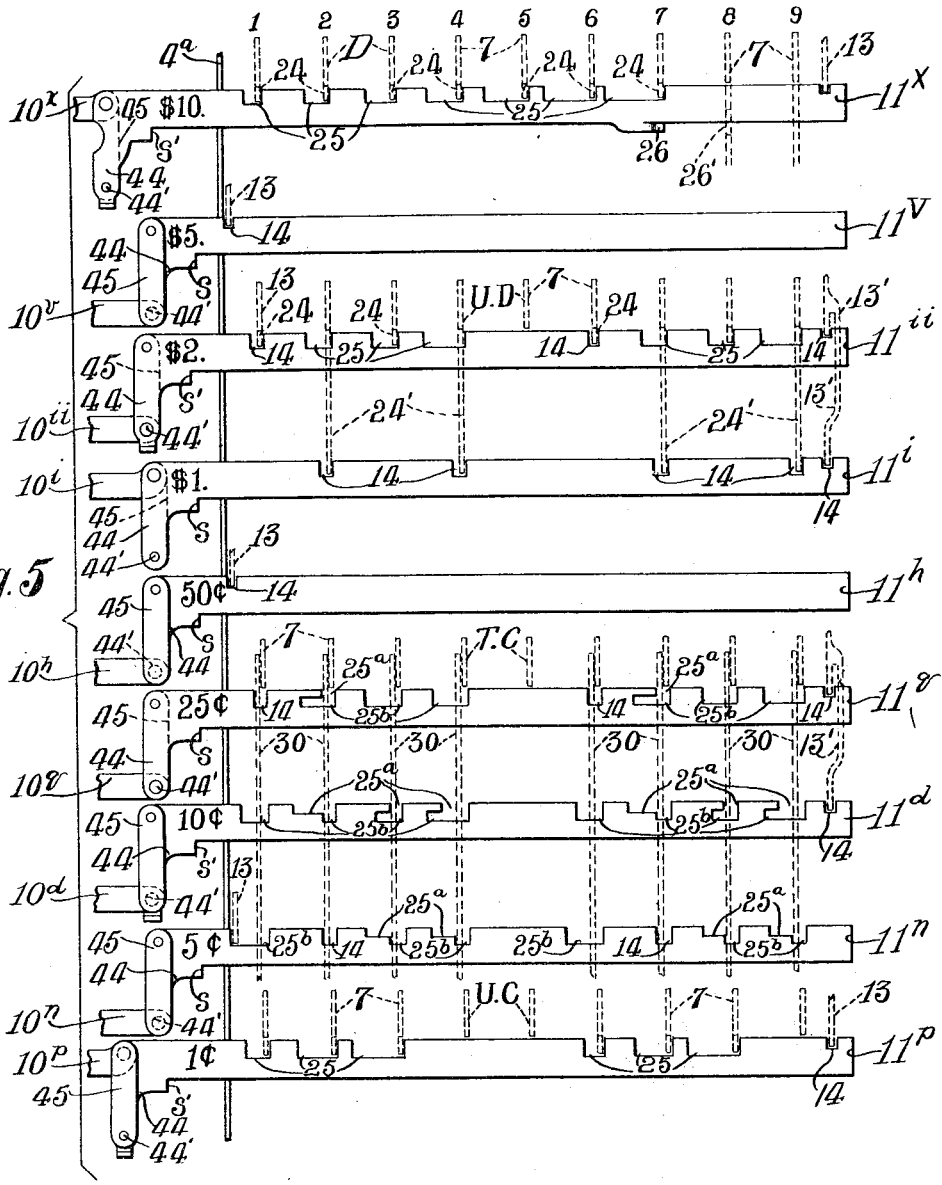

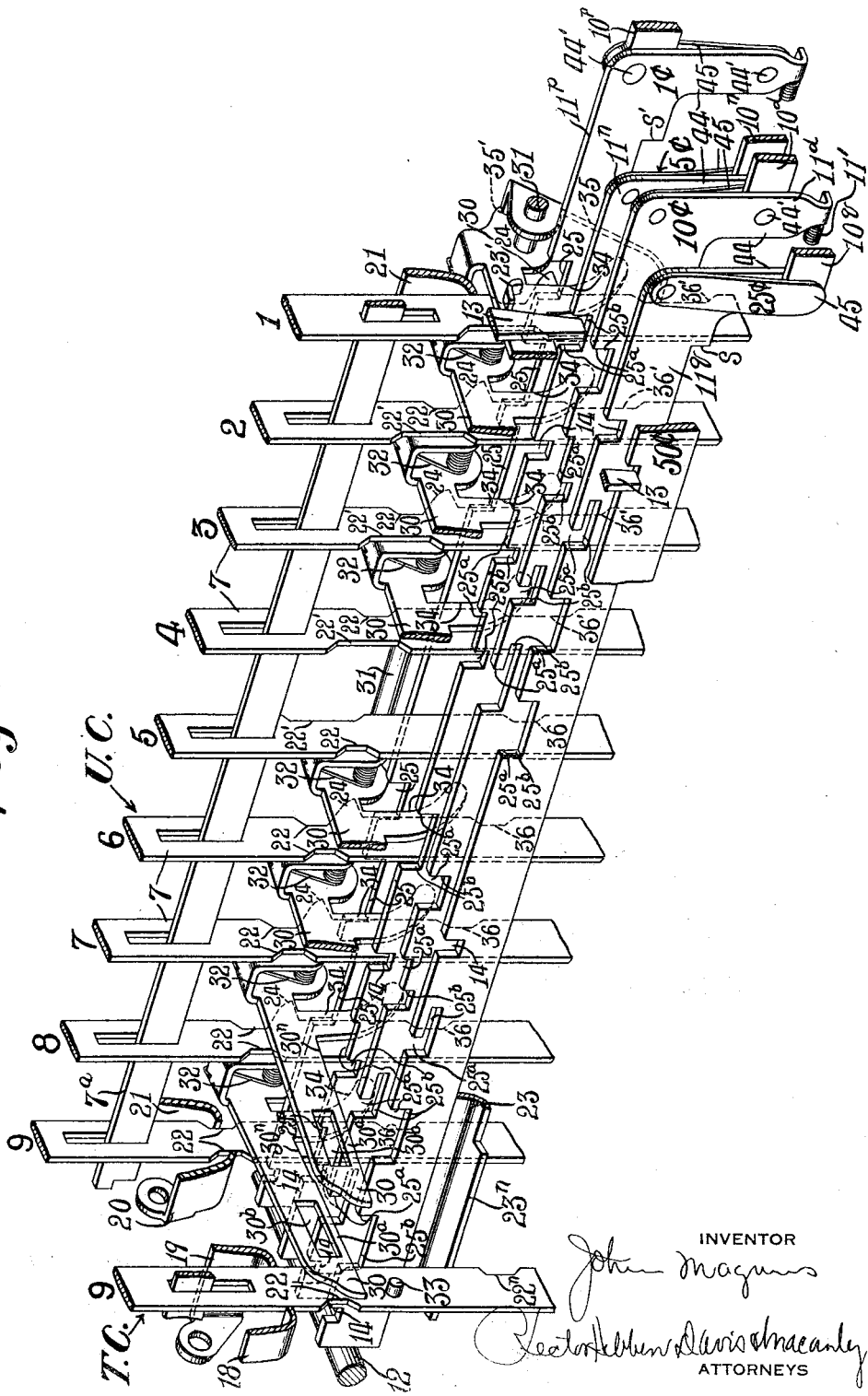

Jan. 22, 1929.
J. MAGNUS
1,699,540
ADDING MACHINE
Filed Jan. 21, 1921
15 Sheets-Sheet 7
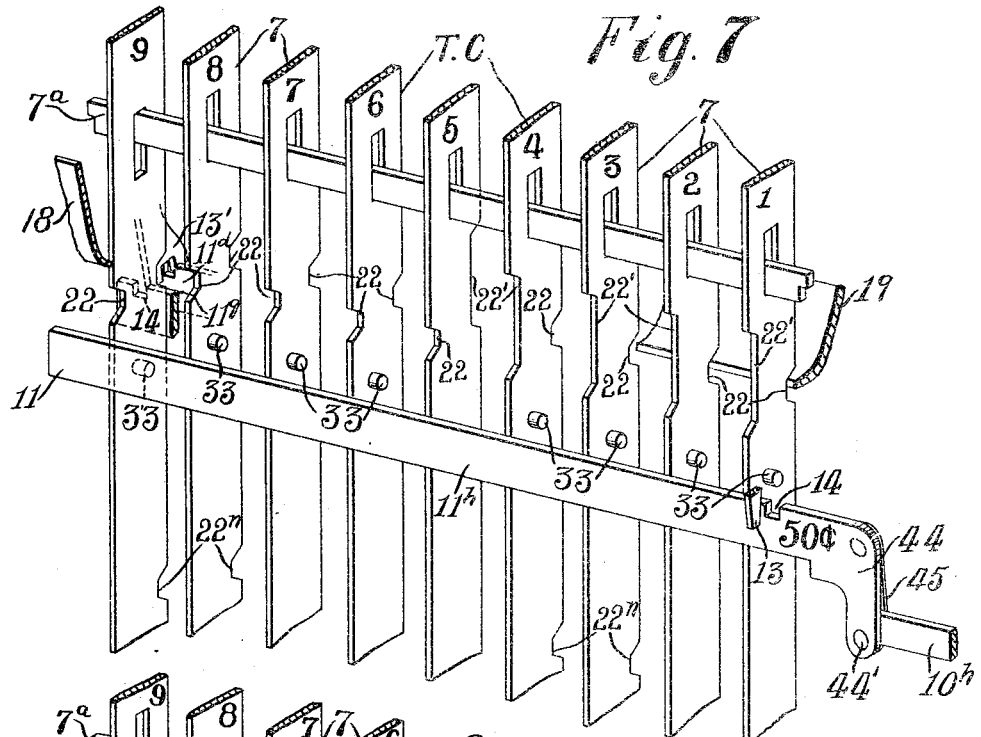
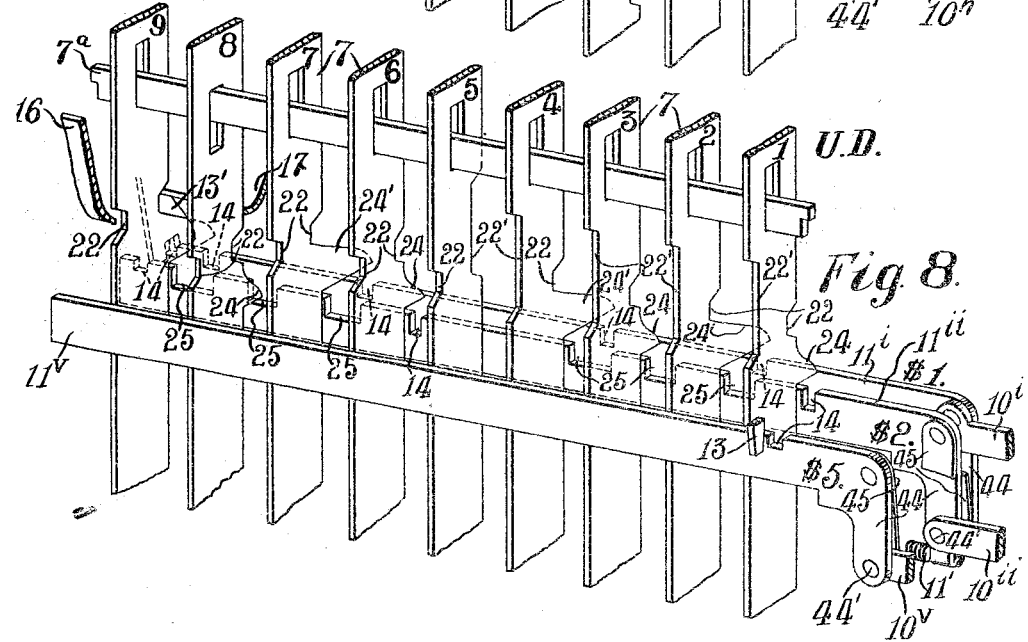
INVENTOR
John Magnus
ATTORNEYS

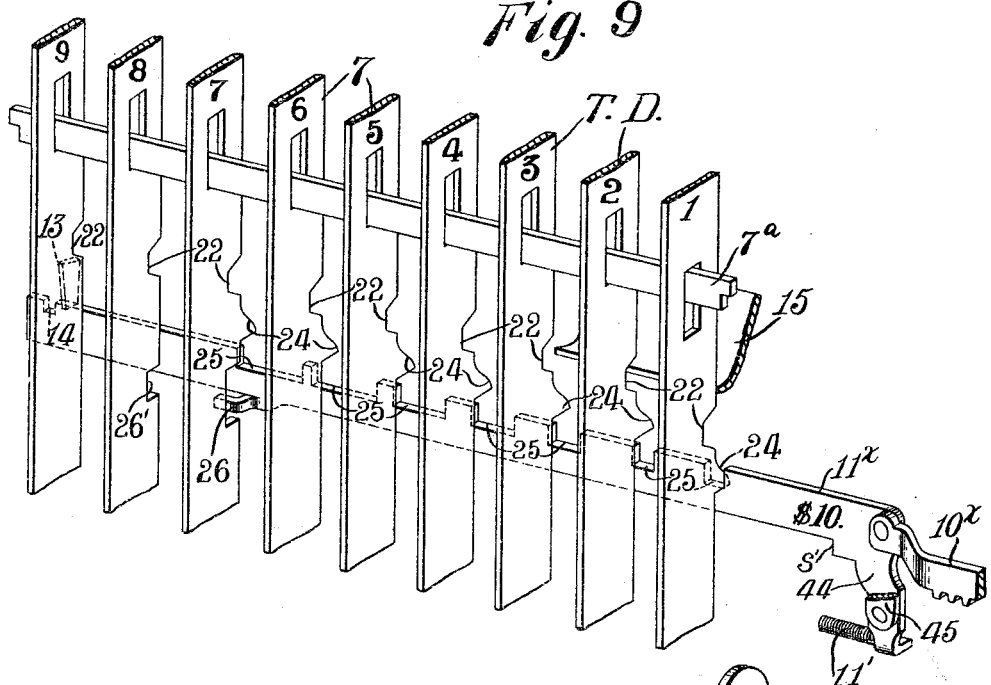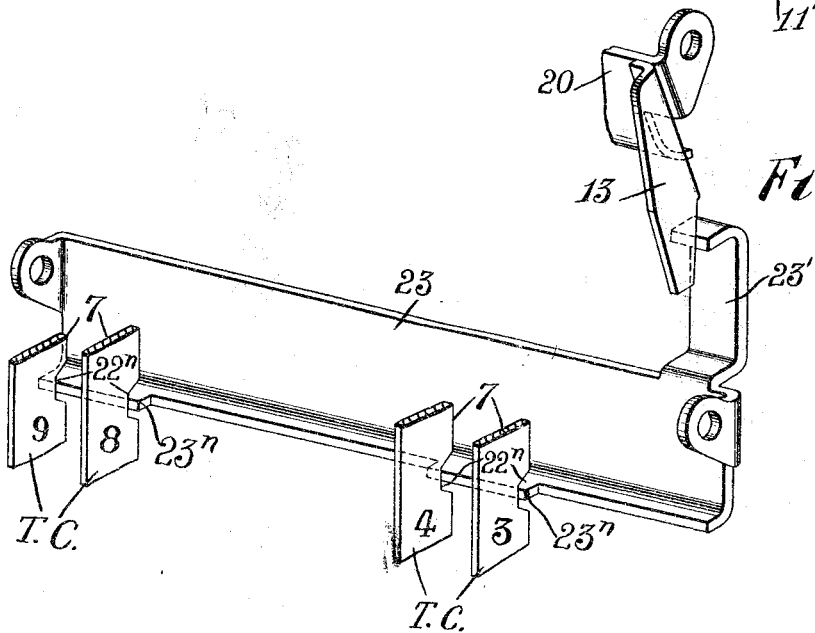

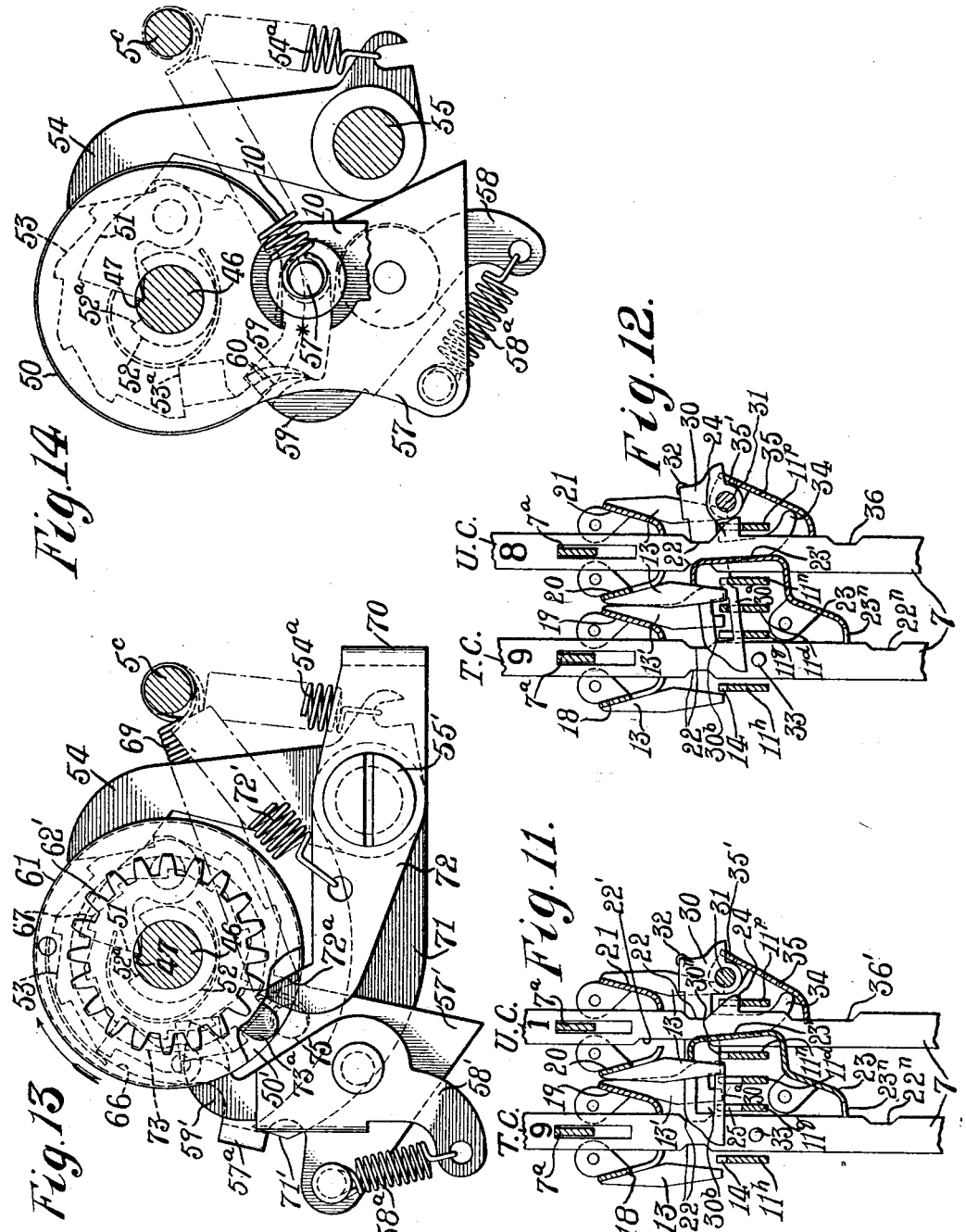

Jan. 22, 1929.

J. MAGNUS 1,699,540

ADDING MACHINE

Filed Jan. 21, 1921  15 Sheets-Sheet 10

INVENTOR
John Magnus
Rector Hibben Davis & Macauley
ATTORNEYS

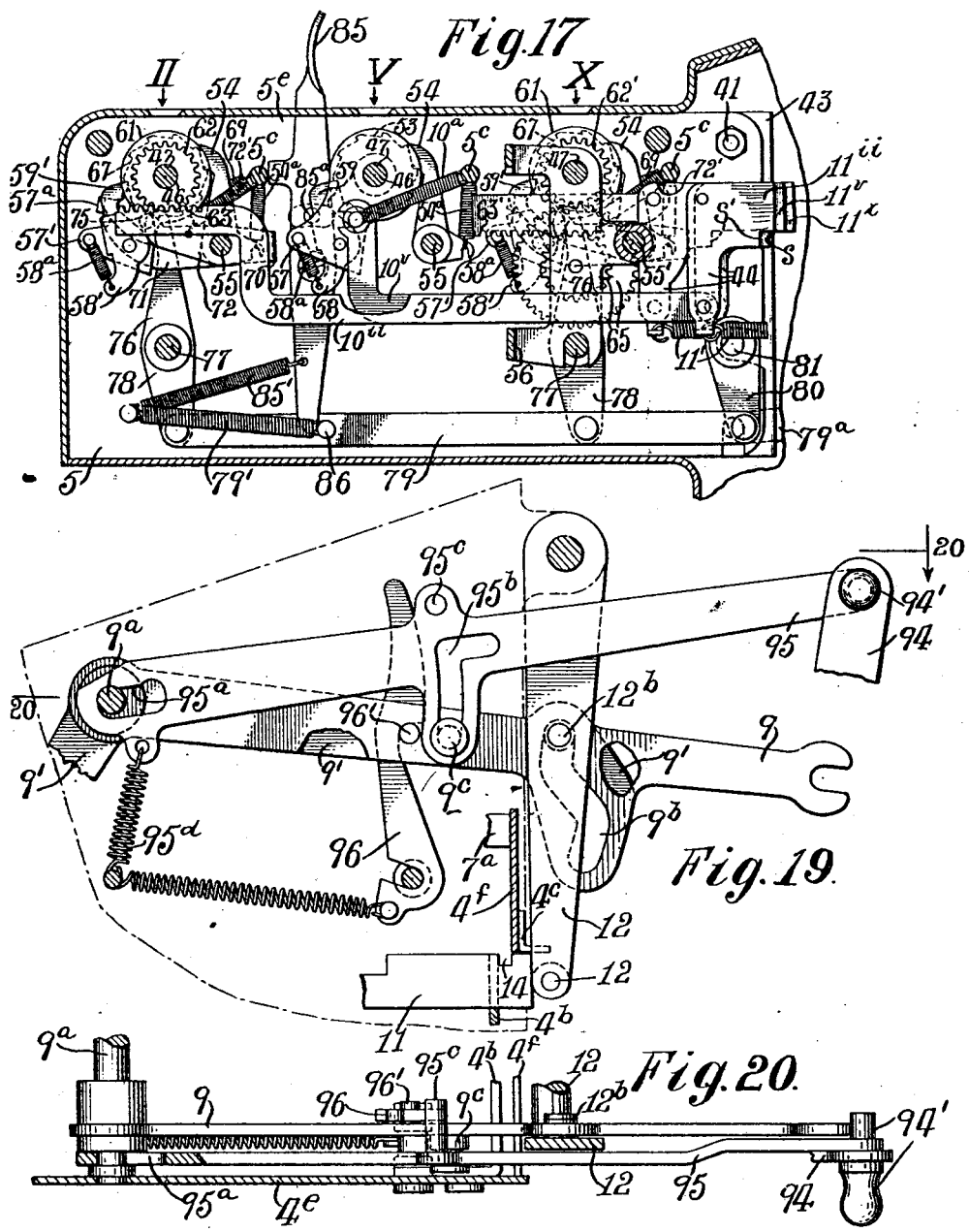

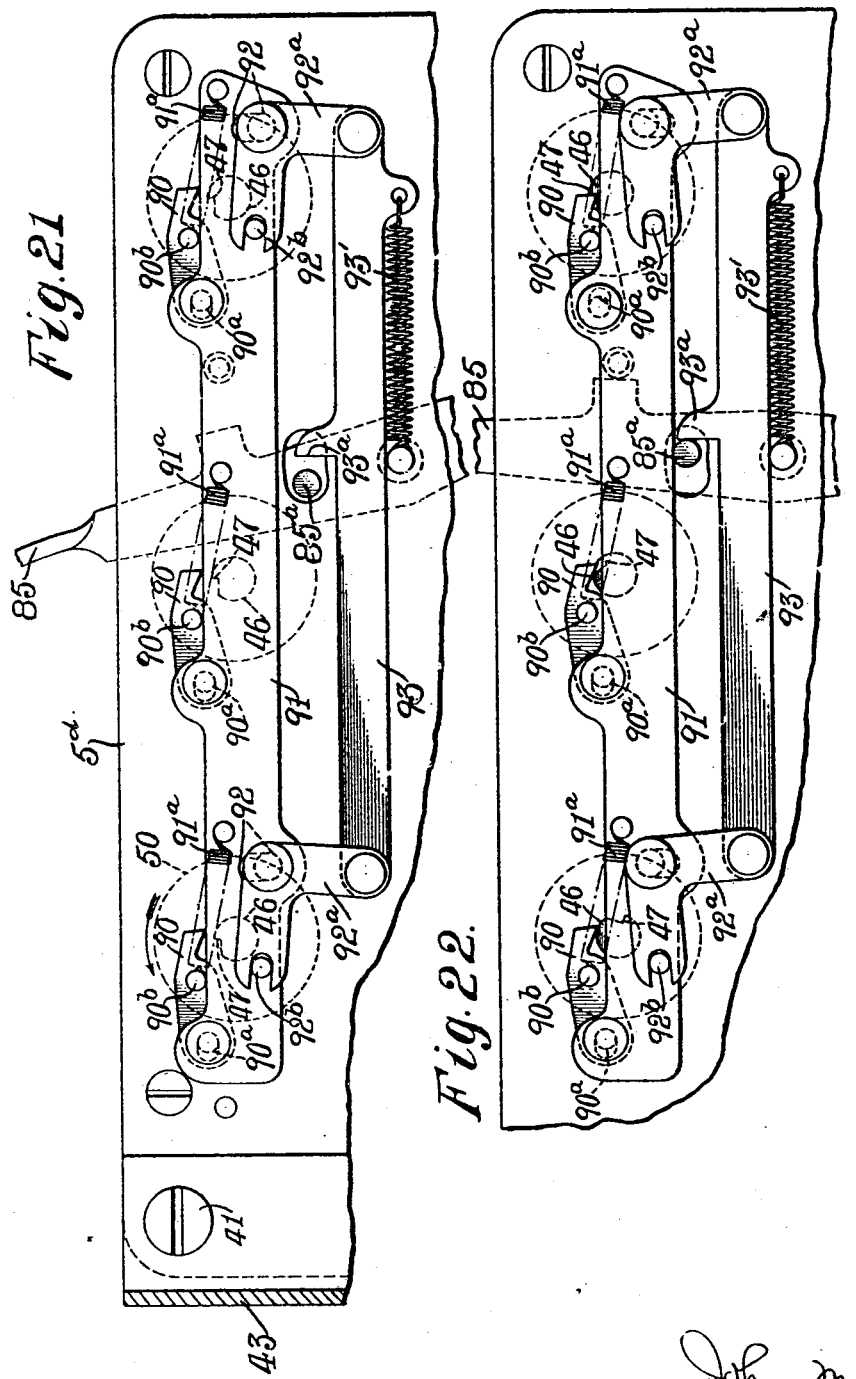

Jan. 22, 1929.
J. MAGNUS
1,699,540
ADDING MACHINE
Filed Jan. 21, 1921
15 Sheets-Sheet 13
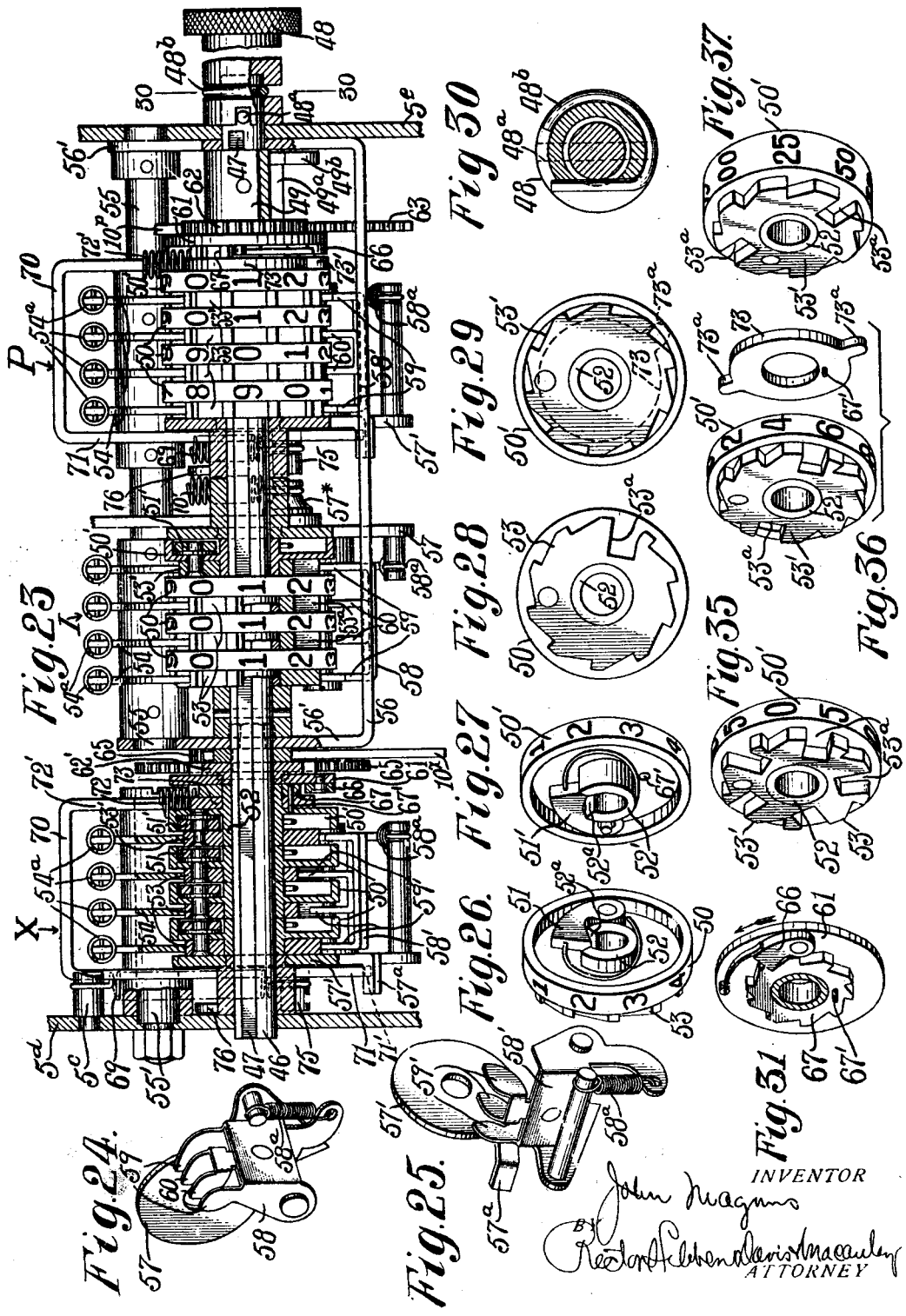
INVENTOR
John Magnus
BY
ATTORNEY Jan. 22, 1929.

J. MAGNUS 1,699,540

ADDING MACHINE

Filed Jan. 21, 1921        15 Sheets-Sheet 14

INVENTOR
John Magnus
BY
Rector Hibben Davis Macauley
ATTORNEY

Jan. 22, 1929. 1,699,540
J. MAGNUS
ADDING MACHINE
Filed Jan. 21, 1921 15 Sheets-Sheet 15

Patented Jan. 22, 1929.

1,699,540

UNITED STATES PATENT OFFICE.

JOHN MAGNUS, OF DETROIT, MICHIGAN, ASSIGNOR TO BURROUGHS ADDING MACHINE COMPANY, OF DETROIT, MICHIGAN, A CORPORATION OF MICHIGAN.

ADDING MACHINE.

Application filed January 21, 1921. Serial No. 438,822.

My invention provides an improved "segregator", that is to say, a mechanism for permuting each item that is set up thereon in its ordinary bookkeeping terms (decimal terms, say) into terms of ordinary currency components (including half-dollars, quarters and nickels, for instance), and registering accumulatively the results of such permutations. The principal use of my machine lies in payroll-segregation, and by its operation to set up and register successively the payroll items it determines, and indicates accumulatively, the precise quantity of currency-pieces of each denomination required to meet the pay-roll, paying every item exactly and with fewest coins or bills or both.

To work such a machine in conjunction with an adding machine advantageously abbreviates making ready the payroll and facilitates "proof" of the segregation, wherefore my device may preferably be built as a separable attachment for an adding machine, the two mechanisms working in common from one set of manipulative devices.

Among the objects of my invention are to provide a segregator operatable permutatively as above described, from a keyboard having no zero-keys, to indicate fewest currency-pieces, and having other functional advantages, and also to secure compactness, ruggedness, manufacturing simplicity and economy, infallibility, ease of operation and maintenance, and general efficiency and convenience, in such a machine; and further objects and advantages that I attain by the features of construction and combinations of mechanisms constituting my invention will become apparent from the following description.

In general, it will be understood that in making up a pay-roll upon the segregator equipped machine herein shown, one sets up each item in decimal terms on the segregator keyboard, thereby setting up also the same item on the adding machine, and after each set-up one reciprocates the adding machine operating lever, which serves in like capacity for the segregator, thereby simultaneously causing the adding machine to perform its items-listing and accumulation-registering functions and the segregator to permute each item into its fewest currency components and to register the same accumulatively. Thus if the first item be $18.93, the adding machine registers the amount in its "bookkeeping" or decimal form and the segregator, upon its several appropriate counters (of which there is one for every currency denomination within the range of the machine) registers as follows:

$10—bills, 1; $5—bills, 1; $2—bills, 1; $1—bills, 1; 50¢—pieces, 1; 25¢—pieces, 1; 10¢—pieces, 1; 5¢—pieces, 1; 1¢—pieces, 3.

Of course the fact that currency issues usually are not limited to these values in which monetary amounts are expressed in bookkeeping is the reason-for-being of a segregator, and while I show and will describe a machine intended for United States currency it will be understood that in its broader aspect my invention may be embodied in machines for other coinage.

Figure 2:
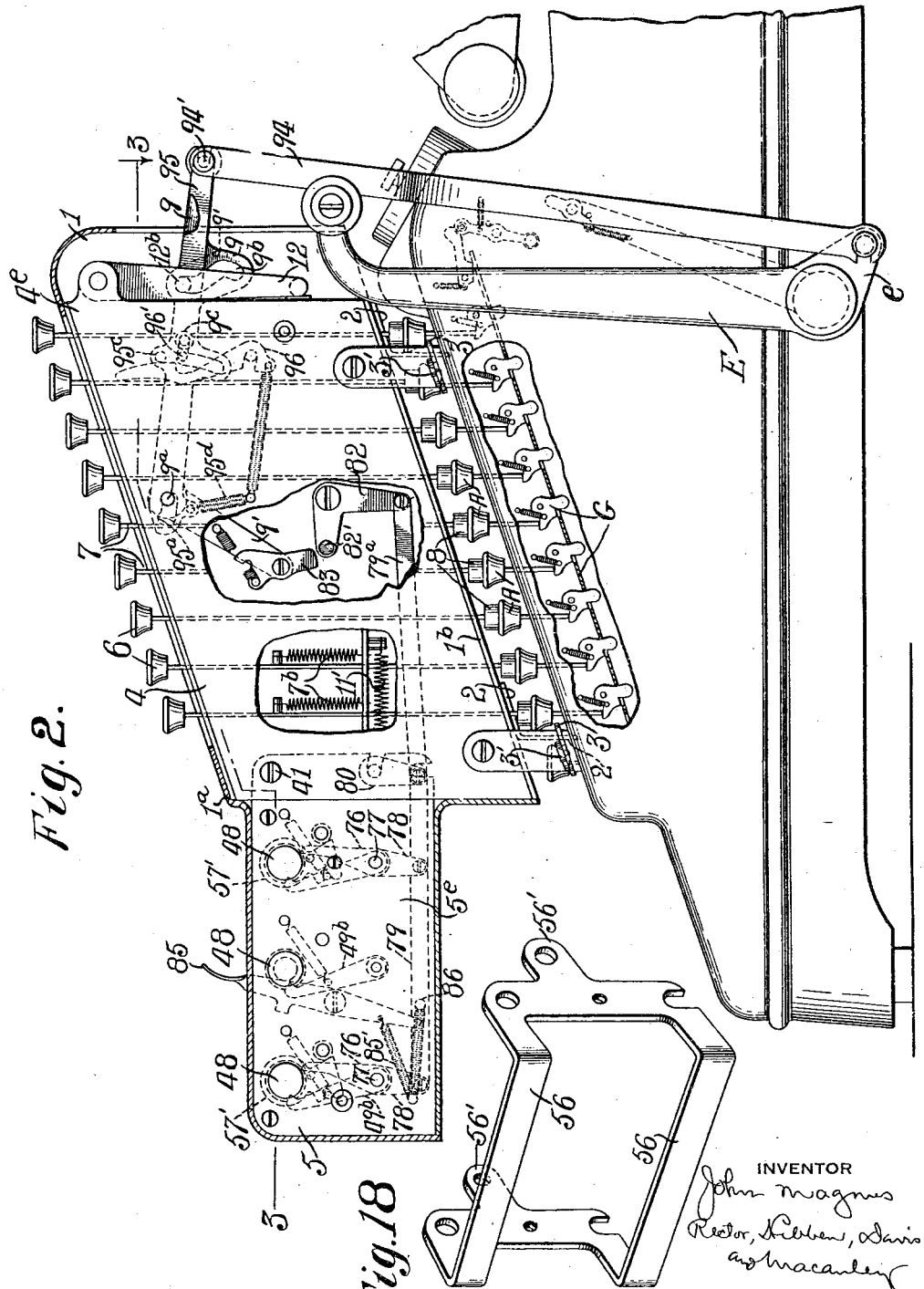
Figure 3:
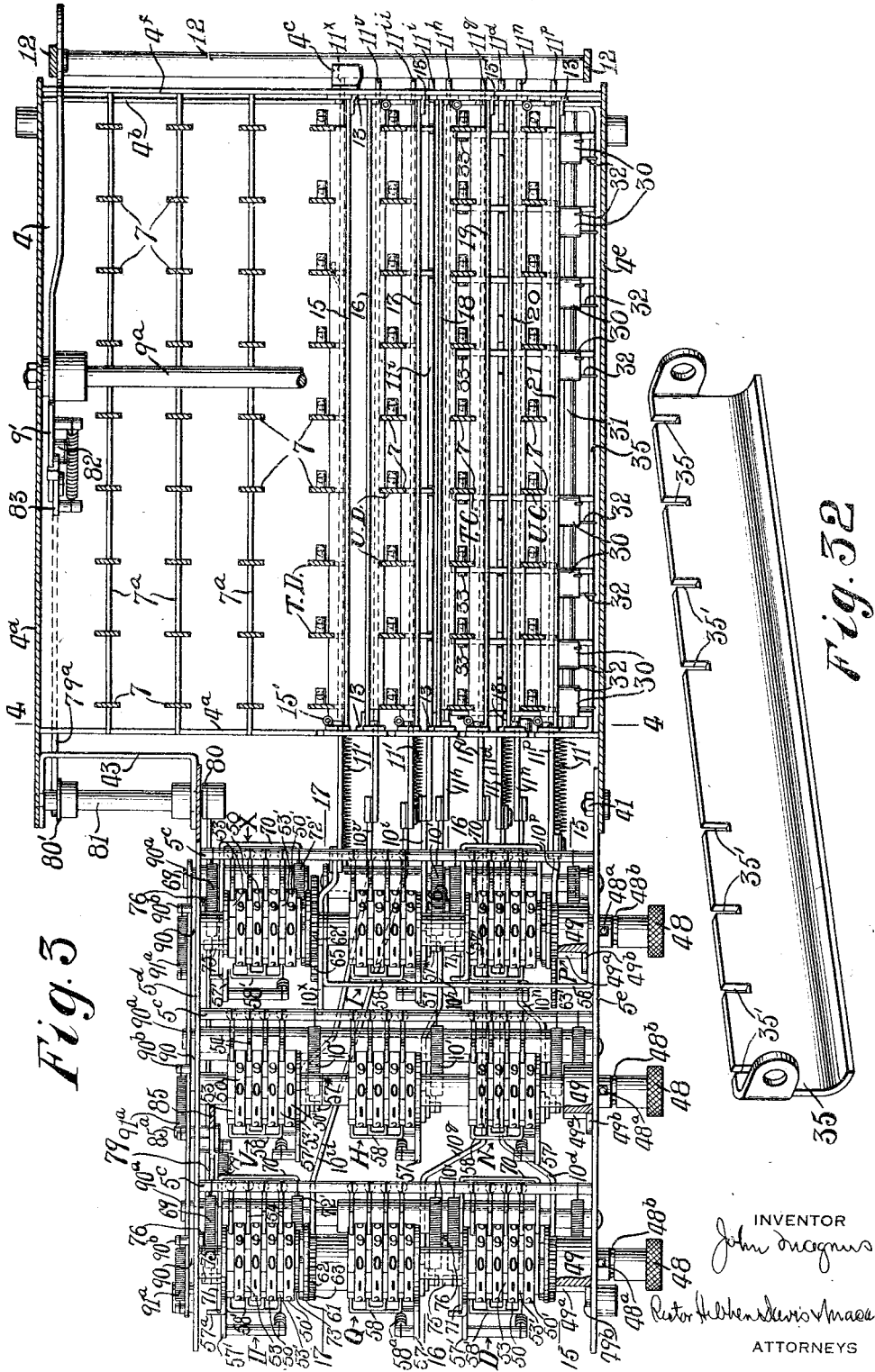
Figure 4:
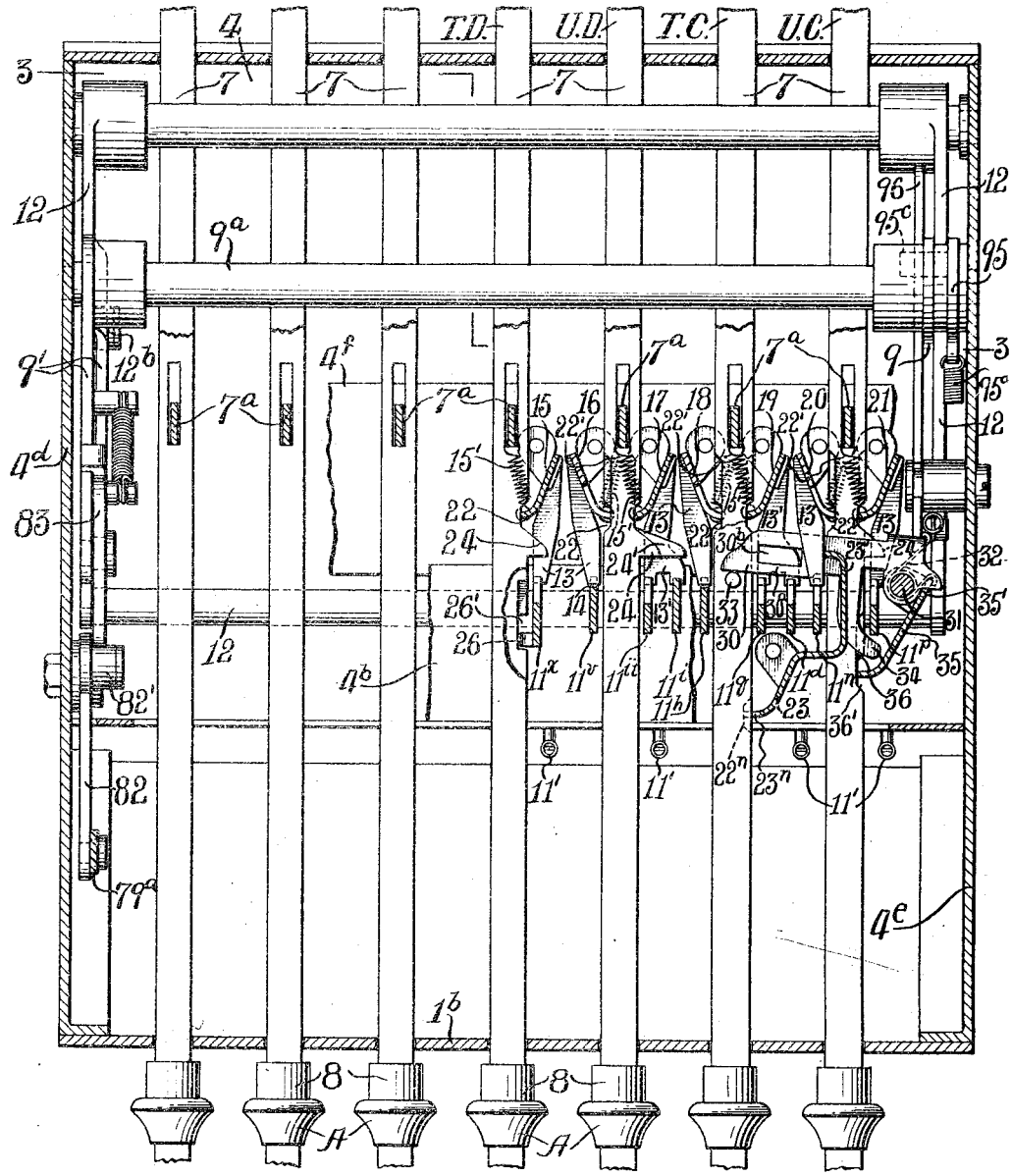
Figure 15:
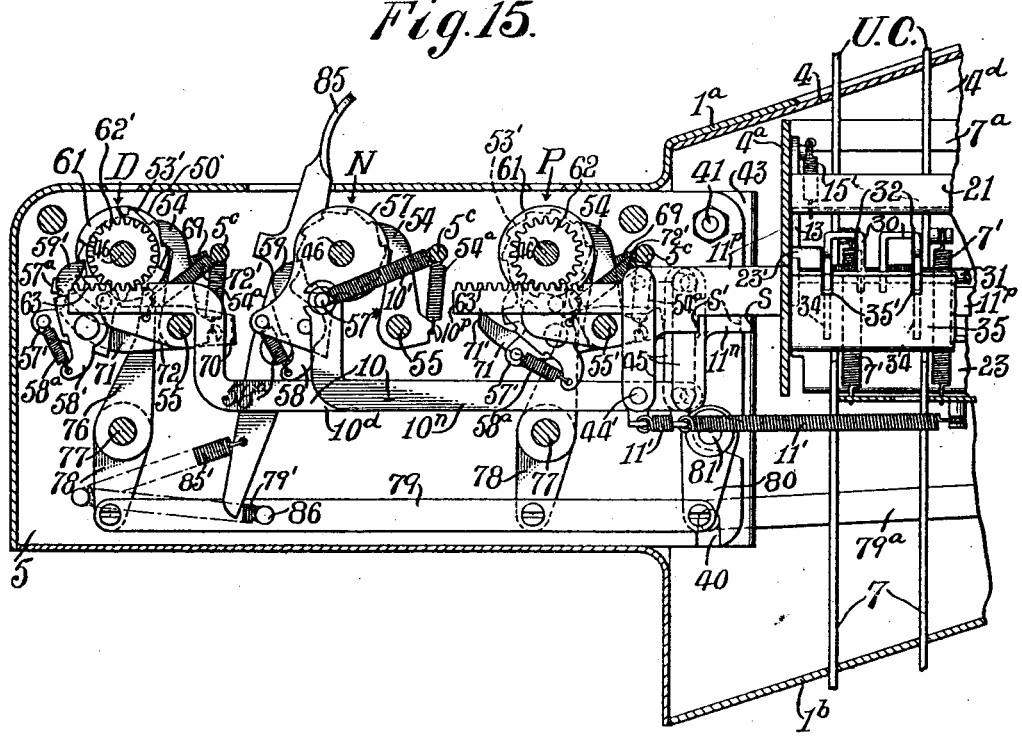
Figure 16:
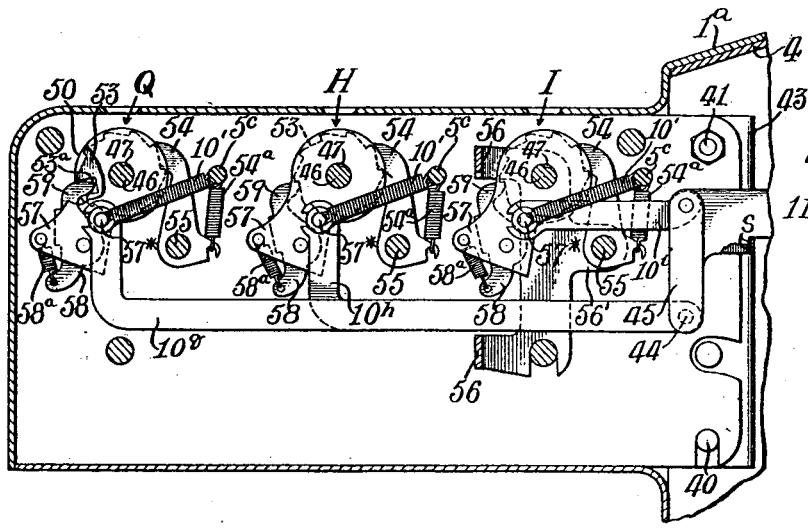
Figure 33:
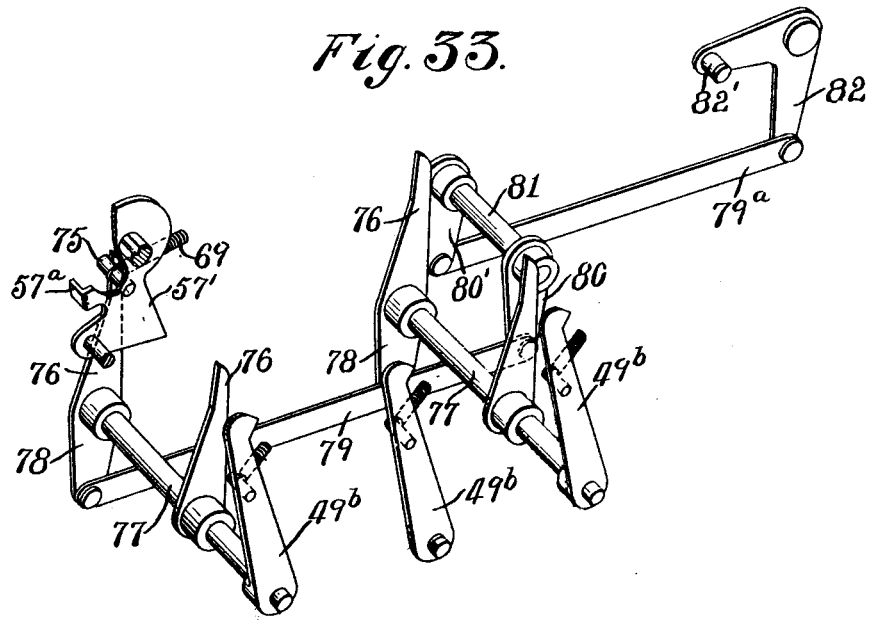
Figure 34:
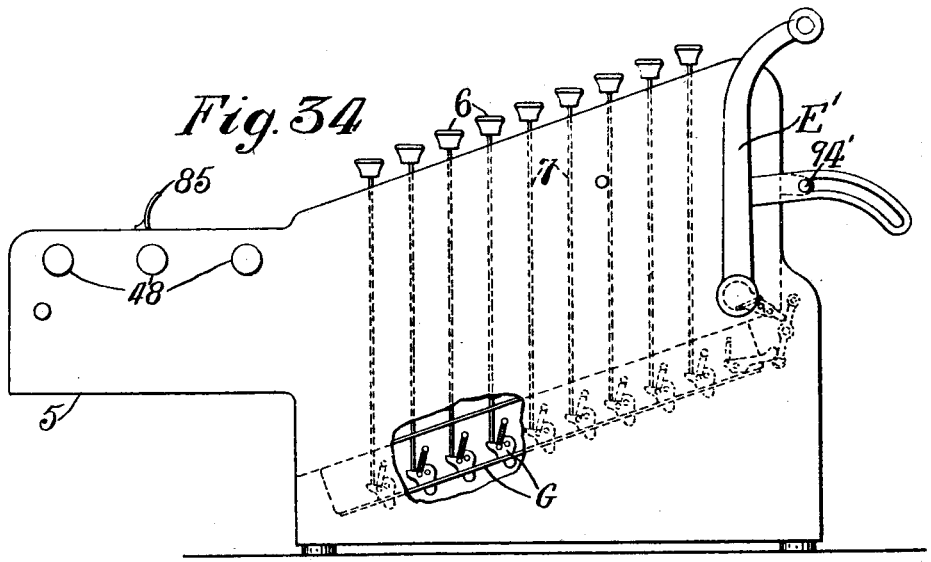
Figure 38:
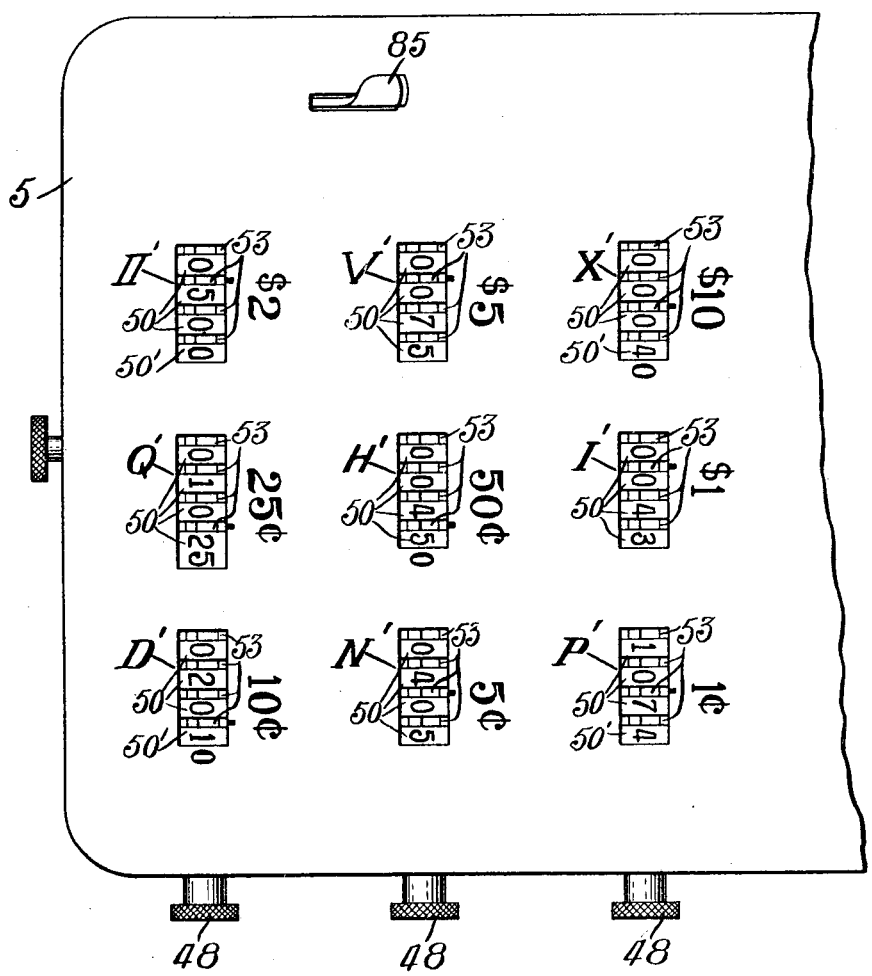

In the drawings Fig. 1 is a plan view of the segregator, with parts of its casing broken away, mounted upon the keyboard of an adding machine; Fig. 2 is a side elevation of the same with parts broken away; Fig. 3 is a section horizontal view through the segregator on line 3—3 of Figs. 2 and 4, with parts broken away; Fig. 4 is a vertical section through the segregator substantially on line 4—4 of Fig. 3; Fig. 5 is a diagrammatic view of the actuator bars, showing their relation to the key-stems, latches and stops; Fig. 6 is a perspective detail showing the units of cents key-stem bank and the 9-key of the tens of cents bank in relation to the actuating bars for the pennies, nickels, dimes and quarters counters and to certain permutation-stops: the 1-key of the first said bank and the 9-key of the second said bank being depressed and the permutation-stop associated with the last named key being accordantly in its upper-stage active position; Fig. 7 similarly diagrams the tens of cents key-stem bank in relation to the actuator-bar for the halves-counter, with the 9-key depressed; Fig. 8 similarly diagrams the units of dollars key-stem bank in relation to the actuator bars for the ones, twos and fives (dollars) counters, with the 8-key depressed; Fig. 9 similarly diagrams the tens of dollars keystem in relation to the tens-counter actuator bar, with the 1-key depressed; Fig. 10 illustrates certain tens of cents key-stems in relation to the nickel-bar tandem-release shutters; Figs. 11 and 12 show the relation of certain units of cent and tens of cent keys to the releasing shutters and the permutation stops in setting up "91" and "98" respectively; Figs. 13 and 14 are side elevations with parts broken away illustrating two types of counters, respectively for multi-step and for single-step operation; Fig. 15 is a vertical section substantially on line 15—15 of Fig. 3 with the dimes-counter partly broken away and presented to show "9" at the sight, and with the carrying pawls of the pennies counter lowered or in cocked position to effect a carry on the subsequent handle stroke; Fig. 16 is a section on line 16—16 of Fig. 3, showing parts of the quarters-counter broken away and with the feed pawl engaged in a deep ratchet-wheel notch to effect a carry; Fig. 17 is a section substantially on line 17—17 of Fig. 3, showing the counters in position to register zero at the sights; Fig. 18 (Sheet 2) is a perspective detail of the supporting brackets for a shaft for the rear counters; Fig. 19 is a detail view of actuating lever mechanism and bail; Fig. 20 is a horizontal section thereof on line 20—20 of Fig. 19; Fig. 21 is a fragmentary left-side elevation showing overthrow-preventing means for the counters standing in normal position, with the detents out of the path of the counter shaft; Fig. 22 is a similar view but with the parts in the act of restoring the various counters to zero, showing the shaft of the third (left) row of counters partly stepped around; the shaft for the second row in the act of turning the wheels from 9 to 0, and the shaft for the front row at 0-position with its overthrow-preventing detent forced back against the tension of its spring; Fig. 23 is a plan view, with parts broken away, the counters of pennies, "ones" (dollars) and "tens" counters being in a zero-displaying position; Fig. 24 is a detail perspective view of the operating element and feed pawls as used with single-steps counters (for nickels, quarters, halves, ones and fives); Fig. 25 is a similar view of the operating element and feed pawls for the multi-step counters (pennies, dimes, twos and tens); Fig. 26 is a perspective detail of a counter dial-wheel as used throughout except for the lowest order in the multi-step counters; Fig. 27 is a perspective detail of a lowest-order dial-wheel for a multi-step counter; Fig. 28 is an elevation of a dial-wheel with a deep notched ratchet; Fig. 29 is a similar view of a plain ratchet; Fig. 30 is a section on line 30—30 of Fig. 23; Fig. 31 is a detail of the ratchet and pawl feeding mechanism for the units-wheel (Fig. 27) of a multi-step counter; Fig. 32 (Sheet 3) is a detail of the permutation-stop controlling shutter; Fig. 33 is a detail of the feed-pawl restoring connection for the zeroizing detents; Fig. 34 is a reduced view showing a self-contained segregator embodying my invention, Figs. 35, 36 and 37 are perspective views showing modified dial wheels of the lowest order for respectively the nickels (also halves and fives) counter, the twos counter (with its carrying disk), and the quarters counter, to modify the reading of the segregator from number of pieces of each denomination to a reading in aggregate value of pieces of each denomination; and Fig. 38 shows in plan the counter-section of a segregator so modified.

*The adding machine.*

Of the commercial adding machine outlined in the drawing, it suffices to summarize that A is its decimal keyboard with the sequentially numbered keys 1 to 9 of each order in a vertical column or bank, making nine horizontal rows, these keys controlling the decimal set-up of items that will be recorded by the printing sectors B on paper strip B' and will be accumulatively registered in counter-section C, actuation being effected as usual by the operating handle E and total printing being controlled by key A'; and further to say that any key, normally spring elevated, may be latched in depressed position by suitable mechanism G (well known and only schematically suggested in Fig. 2) until released by handle E at the end of its full reciprocation.

*The general organization.*

The segregator mechanism is mainly housed in a compact casing 1, the cover-part 1ᵃ of which is removable while its base 1ᵇ is demountably secured on the face of the adding machine frame as by the supporting cross-brackets 2 and retaining latch-devices 3 that engage grooved studs 3'. Such casing contains the selector section 4 that overlies part of the adding-machine keyboard A and also a forwardly projecting counter-section 5 aligning with the righthand portion of the selector-section. The segregator keys 6, in seven banks, have vertical stems 7 slotted for guidance on frame-carried strips 7ᵃ and extending through the casing bottom so that their feet 8 rest on the corresponding adding-machine keys of seven orders under the pressure of light springs 7ᵇ (Fig. 2) and will transmit each segregator set-up to the adding machine. Selective depression of the keys of the lowest four orders control the segregator operation, while suitable actuating means such as the lever 9 having connection, preferably detachable, with the adding machine lever E to be worked from the latter, imparts power to effect the segregator registration.

Commercially, I prefer to make a ten dollar bill the largest currency-denomination employed (although it may be extended to bills of higher denomination if desired) and so in the counting section I provide nine counters in arrangement as indicated in Fig. 1, that I will respectively term and letter, pennies (P), nickels (N), dimes (D), quarters (Q), halves (H), ones (I) twos (II), fives (V) and tens (X) counters; and further, since a single payroll item is not apt to amount to a hundred dollars the capacity of this device for segregation purposes is limited to $99.99 and I therefore employ only the four rows of keys at the right. Fig. 1, indicated as U. C. (units of cents), T. C. (tens of cents) U. D. (units of dollars) and T. D. (tens of dollars), to affect the counters, the remaining three rows of segregator keys being merely, in effect, convenient extensions to the adding machine keys, for use merely in proving results shown on the segregator without removing the latter from the adding machine.

Each counter is pawl-fed, and its feed pawl mechanism is worked by an appropriate indexing bar of the set $10^p$, $10^n$, etc., extending rearwardly through the counter-section, and each at its rear end detachably pivoted to a corresponding actuator bar, $11^p$, $11^n$, etc., that runs rearwardly through the selector section with suitable slidable mounting in the cross members $4^a$ and $4^b$ of the selector-section frame, bottom-flanged rear cross-member $4^c$ (Fig. 19) holding their rear ends down. Each of these slide-bar structures is pressed rearwardly as by springs $10'$ or $11'$ and all of said actuator-bars at their rear ends co-act with a swinging bail 12 crossing the back of the selective section 4, pivoted in side plates $4^d$, $4^e$, and worked from the actuating lever 9. Thus, if any said slide bar structures have (by key operation to be described) been otherwise freed, it follows that when the adding machine handle E is rocked forward and (through lever 9) the bail 12 is swung back, the freed slide-structures will be spring-impelled rearwardly thereby preparing their associated feed pawls to feed the respective counters, while upon the return stroke of the handle E the bail 12 forces said slide-bars back to normal position, accordantly advancing the appropriate counters.

*The selector section.*

For each sliding actuator bar in the selector-section there is a latch finger 13 or $13'$ normally engaging a shoulder or notch 14 in the upper edge of the bar, each such finger being carried by a rocking shutter pivoted in the selector frame-members $4^a$ and $4^c$ above the actuator-bars and paralleling its controlling key-stem bank so that each shutter may be governed by one or more key-stems and when rocked thereby may unlatch one or more actuator-bars. There are only seven of these shutters, numbered sequentially from 15 to 21 in the drawings, for the nine actuator bars, in the preferred embodiment of my invention, for the reason that in certain instances two actuator bars may be always unlatched together without detriment, and may be served by a single two pronged latch finger $13'$ in the interest of compact and simple construction. Preferably, too, I dispose the fingers alternately at opposite ends of the shutters for non-interference in the confined spaces between the key-stems. Each swinging shutter, normally held by a spring $15'$ with its finger in latched position, co-operates with the stems 7 of an appropriate key bank, its edge bottoming in notches 22 or $22'$ in said stems. If the key-stem is one that, when depressed, is to move the shutter to unlatch an actuator-bar, its notch 22 is short and cam-shouldered at its upper end; if the key-stem is not to move the shutter the notch $22'$ is long for lost-motion. Keys U. C. govern, on the right, the shutter 21 for the pennies bar: on the left, the shutter 20 for the nickel bar $11^n$: keys T. C. control, on the right, the shutter 19 having the two-pronged finger $13'$ for the dimes bar $11^d$ and quarters bar $11^q$ (also they control the nickel bar through tandem shutter 23 to be described) and on the left the shutter 18 for the halves bar $11^h$: keys U. D. control, on the right the shutter 17 with its two pronged finger for "ones" and "twos" bars $11^i$ and $11^{ii}$: and on the left, the shutter 16 for the "fives" bar $11^v$: and keys T. D. control only the shutter 15 for tens bar $11^x$.

Depression of any key will cause one or more of the shutters to unlatch an actuator bar or bars, and in some instances this is all that is needed to free an actuator bar for the subsequent bail-controlled reciprocation that heretofore has been referred to. So it is of bars $11^v$ and $11^h$ specifically, because a $5.00 bill is used invariably, and only, when a U. D. key from 5 to 9 inclusive is depressed and a 50¢ piece is correspondingly used invariably and only, when a T. C. key numbered 5 to 9 is depressed. Furthermore neither of these currency pieces (among others) is used more than once in any item, so each such actuator bar $11^v$, $11^l$, $11^h$, $11^q$ and $11^n$ (Fig. 5) that has no multi-step operation, may have a stop shoulder $s$ to strike supporting plate $4^a$, while each multi-step bar may have a similar shoulder $s'$ to limit its range of motion to the maximum ever required of it. With respect to the two actuator bars aforementioned then, the constructions are identical, the key-stems U. D. and T. C. respectively controlling them appropriately having long or idle notches $22'$, at the left of key stems "1" to "4" and short or cam notches 22 at the left of keys "5" to "9" so that only the last-mentioned keys trip out the respective latch shutters (see Figs. 7 and 8). Thus if $5.00 be set up on the segregator, only the 5-key of the U. D. bank is depressed, only shutter 16 is operated to release actuator bar $11^v$ and the reciprocation of the operating handle thereupon may cause the $5.00 counter V to advance one number by this simple and direct operation.

Where it is necessary that one of the actuator bars be releasable by keys of two different orders, (as for example the nickel-bar 11ⁿ that should be releasable by certain keys of both the U. C. and T. C. banks), this may be done as shown in Figs. 4, 10 and 11 by making the latch-shutter 20 directly operatable by the key stems of one (the U. C.) order and providing a tandem release-shutter 23, extending lengthwise below the actuator bars and operatable by notches 22ⁿ in the key stems of the other (T. C.) order, this tandem shutter having its finger 23' bearing against the finger 13 of said shutter 20 as shown in Fig. 10. Such provision is necessary, to generalize, because the depression of any key of the segregator should cause the shutter-unlatching of all actuator bars that must be called into service to register the value represented by the depressed key alone, and certain tens of cents keys called for a nickel and a quarter.

Further, some actuator bars (for counters P., D., H and X) must have a multi-step range of movement variably dependent on what key of the controlling order is depressed, and for this control appropriate keystems of banks U. D., U. C. and T. D. have stop-lugs 24 extending over the actuator bars, to co-operate with respectively stepped or graduated-length notches 25 in the tops of the bars opposite the respective key-stems. Keys T. C. control the bar 11ᵈ in a specifically different way.

For two actuator bars this range-varying control only is needed, in addition to shutter-unlatching, namely for bars 11ˣ and 11ᵖ, because neither "combinations" nor "permutations" occur in the values that they represent: that is to say for amounts ending in 1 to 4 and 6 to 9 in the "cents" column, the penny-counter P must invariably work one, two, three or four steps, and for amounts beginning with tens of dollars the steps of the counter X must always accord with the number of the key depressed. Thus, referring to Figs. 5 and 9 as illustrating the selective control over the $10.00 actuator, 11ˣ, every key stem T. D. has a short shutter-notch 22 to cause shutter 15 to release the bar, as upon the illustrated depression of key No. 1, and each key up to No. 7 has a short stop-lug 24 to co-operate with the adjacent one of the multi-step notches 25. Simply as a mechanical expedient, because an eight or nine-step notch would be too long, the bar has a finger 26 that, when key No. 8 is depressed, will strike the side thereof, giving an eight-step stop, but when key 9 is depressed this finger will slide through the clearance notch 26' of key 8 until limitation-stop s' strikes the front plate 4ᵃ.

Similarly, referring to Figs. 5 and 6 as to the U. C. keys, the stem for the 5-key has on its right side a long or idle notch 22' (pennies never entering into an amount ending in five cents), but all other stems have at the right short cam notches 22 for said shutter 21. The 1, 2 and 3 keys have stop lugs 24 for co-operation with one-, two- and three-step notches 25, and this arrangement is duplicated with respect to the 6, 7, and 8 keys. The 4 and 9 keys need no stop lugs as they permit the bar to go until its four-step limitation stop s' strikes the part 4ᵃ. On the left side of the stems the keys "5" to "9" have short cam-notches 22 to rock the latch-shutter 20 for the actuating bar 11ⁿ of the nickel counter; keys "1" to "4" having long, idle notches 22'.

With respect to the $1.00 and $2.00 actuator bars, 11ⁱ and 11ⁿ, "combination" is necessary, that is to say, in order to make up successive values up to $4.00 one uses successively one $1.00 bill; one $2.00 bill, one $1.00 and one $2.00 bills; and two $2.00 bills; and from 6 to 9 these combinations repeat (plus a $5.00 bill). With Figs. 5 and 8 (the latter showing the 8-key depressed) it will be seen that for such combinations all U. D. keys except the 5-key have cam notches 22 co-acting with shutter 17 for the two pronged release finger 13' for bars 11ⁱ and 11ⁿ, and that the keys severally have appropriate short or long stop lugs 24 or 24', co-operating with the stop-notches 25 of the actuator bars. In bar 11ⁱ there are merely relocking-notches or slits for the long lugs but in bar 11ⁿ there are relocking slits and one-step notches for the short lugs and one-step and two-step notches for the long lugs, so giving the above-stated combinations. Specifically keys 2, 4, 7 and 9 have the long lugs 24', keys 1, 3, 6 and 8 the short lugs and in bar 11ⁿ there is a relocking slit at keys 1 and 6, one-step notches at keys 2, 3, 7 and 8, and two-step notches at keys 4 and 9. Thus if the 8 key be depressed as shown, in addition to the key releasing the $5.00 actuator bar 11ᵛ by the short notch 22 at the left as heretofore described, finger 13' of shutter 17 releases bars 11ⁱ and 11ⁿ, the former to make its single step movement limited by stop shoulder s and the latter to make a movement limited to a single step by the engagement of short lug 24 in the one-step notch 25.

The control of the actuator bars for quarters, dimes and nickels, to register any amount set up in terms of fewest coins, involves "permutation", or exchange of the two release selections appropriate to two keys of different orders individually for a different selection appropriate to the two keys jointly. Thus, the registration appropriate to the depression of a T. C. key alone may be varied according to the value of the U. C. key that may be concurrently depressed. For example, where a 20¢ set-up requires registration of two dimes, a 25¢ set-up requires registration of one quarter; 40¢ requires registration of a quarter, one dime and a nickel, while 45¢ requires registration of a quarter and two dimes; etc.

To secure the permutation the affected actuator bars 11ⁿ, 11ᵈ and 11ᵍ, unlatchable by the shutters 20, 23 and 19 are stop-controlled from certain key stems of the T. C. and U. C. banks jointly through permutation stops 30 which may, by taking different positions, disable or free different ones of the several actuator bars that they serve and which are themselves governed, as to the different selective positions that they take, from said key-stems.

From the right-hand side of the stems of keys T. C. (Fig. 7), controlling the shutter 19, the latch-finger 13′ common to the quarters and dimes actuator-bars, 11ᵍ and 11ᵈ, will be operated by short cam-notches 22 upon the depression of any except the 5-key, which has a long or idle right-hand notch 22′ because neither the quarter nor the dime ever enters into a transaction between fifty and sixty cents. While the quarters and dimes bars are always unlatched together, it will become apparent that if either is not needed it is disabled by the proper permutation-stop 30. Further, the 3, 4, 8 and 9 keys, only, of the key bank TC have the additional cam notches 22ⁿ, lower down, co-operating with lip projections 23ⁿ on the tandem-release-shutter 23 (Fig. 10). Thus, upon depression of one of these four keys, shutter 20 for the nickel actuator-bar 11ⁿ is thrown to unlatching position; because only for the amounts 30¢, 40¢, 80¢ and 90¢ will the sole depression of a T. C. key require the registration of a nickel, all other calls for nickel registration depending on the keys of the U. C. bank.

The eight permutation stops 30, identical in construction, extend across in front of the 1-to-4 and 6-to-9 keys of banks UC and TC and have their yoke-shaped bases pivoted on a longitudinal, frame-carried shaft 31 and acted upon by coiled springs 32 to depress the stops. The 5 keys need no stops because in the TC bank the 5-key does not trip any actuator affected by the permutation stops. Each permutation stop 30 is normally held in raised or inactive position by a controlling pin 33 on the stem of the corresponding T. C. key so that when a tens of cents key is depressed the corresponding stop 30 is freed for spring-depression. These stops 30 are operable through two active stages or levels of depression, movement to the first stage occurring immediately upon depression of a T. C. key and locking any actuator bar not needed for proper segregation of the amount expressed on the T. C. key itself, and the movement to its second or lower stage being controlled from the U. C. key-bank to establish such setting as need be to segregate the amount expressed on the T. C. and U. C. keys together. Thus each stop 30 has a tail 34, that, when the stop is at the first stage of depression, bears against a permutation-shutter 35 (as in Fig. 11) which is pivoted on the shaft 31 and pressed inwardly by all of the springs 32, each of which is coiled around shaft 31 and bears against its permutation stop and the common shutter 35. To position the permutation stops against displacement along their shaft 31 shutter 35 may have its upper edge notched as at 35′ (Fig. 32) so as to engage a portion of the base of each stop without interfering with the rocking movements of either part. For rocking the shutter 35 the U. C. key-stems "5" to "9" have short or cam notches 36; keys 1 to 4 having long or idle notches 36′ correspondingly positioned in their stems. Thus, when any stop 30 has been lowered to first stage position by depression of its associated T. C. key, concurrent depression of a U. C. key numbered from 5 to 9 will swing back the permutation shutter 35 and allow the selected stop 30 to descend to second or lowest stage position, these two positions being respectively illustrated in Figs. 11 and 12.

The travel-limiting stop notches 25, and locking-slots in the tops of the actuator bars 11ⁿ, 11ᵈ and 11ᵍ, appropriately located for co-action with the several permutation stops, are accordantly made of two-stage depth, the first or upper-stage notch-formation being referred to as 25ᵃ and the second or lower-stage formation as 25ᵇ. The necessary permutations sometimes require one of the actuator bars 11ᵈ or 11ᵍ to be locked in the first stage and freed in the second stage, and in such instances the appropriate notches 25ᵇ for the second stage of these bars are under-cut. Such a condition never exists as to the nickel bar 11ⁿ and therefore no second stage notches of this bar need be under-cut.

Accordantly with these conditions, each stop-member 30 provides in its blade a solid barrier-portion 30ⁿ to co-operate with the nickel-bar notches and, for co-operation with the notches of the dimes and quarters bars 11ᵈ and 11ᵍ, it has a narrow band or barrier 30ᵃ at its lower edge that will co-operate with the notch-formation 25ᵃ when the permutation stop is in first stage position, and above the barrier a slot or clearance space 30ᵇ to give passage for the actuator-bar portions of the first stage formations that over-hang those second-stage notches 25ᵇ which are under-cut.

The notch-and-barrier arrangement appurtenant to the 1-key of the T. C. bank, which unlatches only the dimes and quarters bars is such as to re-lock the quarters bar 11ᵍ and free the dimes bar 11ᵈ in both stages, the appropriate notch in the quarters bar 11ᵍ being merely a short locking-slot and the notch in the dimes bar 11ᵈ being of one-step length in both stages. For the 2-key (which also unlatches only these two bars) the notch-and-barrier arrangement gives in the upper stage a re-locking of the quarters bar and a two-step release of the dimes bar, while in the lower stage it gives a release of the quarters bar and locking of the dimes bar and the nickles-bar 11ⁿ (the last named actuator being unlatched by any U. C. key that will rock the permutation shutter 35). Opposite the 3-key (which, it will be remembered, is one of the four that will work the tandem shutter 23 to unlatch the nickels-bar 11ⁿ) the upper-stage notching locks the dimes bar 11ᵈ and permits movement of the quarters and nickels bars 11ᵃ and 11ⁿ, and in second or lower stage locks the nickels bar, permits single step movement of the dimes bar and frees the quarters bar. Opposite the 4-key this same arrangement is provided except that the lower stage notch 25ᵇ for the dimes bar 11ᵈ is cut away to permit two-step movement of the said bar. The successive notch arrangements characterizing these provisions for the 1 to 4 keys of the T. C. bank are duplicated with respect to the 6 to 9 keys, whose registration must be the same as the respective ones first described, except that a 50 cents piece is additionally registered.

Thus, referring to Figs. 11 and 12, if 91¢ is to be set-up, as illustrated in Fig. 11, the depression of the 9 key in the T. C. bank unlatches the halves, quarters, dimes and nickels bars, 11ʰ, 11ᵃ, 11ᵈ and 11ⁿ, unlatching the first three directly by its shutters 18 and 19, and unlatching the fourth-mentioned bar by its operation of the tandem shutter 23. Also, of course, the 9-key drops its permutation stop 30 to first-stage position. Depression of the 1-key the U. C. bank does not rock the permutation shutter 35 and so the stop blade 30 remains in first-stage position; but the latch shutter 21 does unlatch the pennies bar 11ᵖ. Under these conditions it will be clear from the notch arrangement shown in Fig. 6 (where the stated set-up is indicated) that the halves, quarters, and nickels actuator-bars will all stand freed for their single step movement; the dimes bar will stand released for movement limited to one step by the upper stage notch 25ᵃ and stop-blade-barrier 30ᵃ, while the pennies bar is of course limited to one-step movement by the length of its appropriate one-step notch 25, co-acting with the stem-lug 24 of the 1-key. If, however, the set-up be "98" as illustrated in Fig. 12, the depression of the U. C. 8-key rocks permutation-shutter 35 to permit stop 30 to drop to its second stage, in which position it locks the nickels bar 11ⁿ and frees the dimes bar 11ᵈ for full or two-step movement. Further to illustrate, where a set-up of 20 cents is made the resultant first-stage setting of stop 30 for the 2-key releases the dimes bar 11ᵈ for two-step movement and locks the quarters bar 11ᵃ, but if this be changed by depression of the 5-key of the U. C. bank to represent 25¢, although the nickel bar is thereby unlatched, the depression of the permutation stop 30 to second stage locks out both the nickels bar 11ⁿ and dimes bar 11ᵈ and frees only the quarters bar 11ᵃ for its bail-controlled registering movement.

In general, then, every requisite higher-order (TC) key sets its permutation stop to permit registry of the amount indicated by it; every lower order key, that may change the components to secure the desired fewest-coin registration, resets the stop to a different position for a requisitely-changed effect.

*The counter section.*

The counter section 5 is preferably detachable as a unit from the selector section, its right and left side plates 5ᵉ and 5ᵈ connected by suitable cross bars 5ᶜ being respectively mounted, by notch-and-stud engagement 40 and by bolts 41 (Fig. 16) on the right frame plate 4ᵉ and on a filler-plate yoke 43 (Fig. 3) said yoke taking care of the difference in width of the two sections and being fixed to the side wall 4ᵈ of the selector section. For separably pivoting the several indexing bars 10ᵖ etc. to their respective actuator bars 11ᵖ etc. each of the latter is formed with a vertical head 44 at its front end and the free end of the pivot pin 44′ carried thereby is overlain by a leaf spring 45 secured to the opposite end of the head. For the rearward row of counters the indexing bars, 10ᵖ, 10ⁱ and 10ˣ, are conveniently connected to the top of the heads, and for the remaining counters, connection is made to the bottoms of the heads so that the bars may pass under the counter shafts.

The nine counters are mounted on the front, middle and rear counter shafts 46, all of which are alike, each having a shoulder-and-incline-pawl-driving groove 47 for counter-zeroizing purposes. Each shaft carries beyond the casing 1, a quick-detachable twirling-knob 48 that may conveniently be of the construction shown in Figs. 23 and 20, such knob making pin and slot connection at 48ᵃ with the shaft to cause the shaft to turn with the knob, and having a spring 48ᵇ engaging the groove in the shaft so as frictionally to hold the knob in place on the shaft against accidental removal. To keep it from turning except when rotated by the twirling knob, and to hold it in zeroizing position, each shaft has pinned to it a collar 49 having a V-shaped recess 49ᵃ engaged by the V-nose of a spring-pressed friction-detent 49ᵇ, which detents may be suitably mounted on the side frame members or connecting cross-bolts of the counter-section frame.

Each counter is shown as comprising four dial wheel structures and throughout all the counters these may be of the construction shown at 50, Fig. 28, except that the lowest-order wheel of those four counters P., D., H, and X that may receive multi-step actuation should be modified for multi-step feed, these wheel structures being of the form shown at 50′, Figs. 27 and 29. The four multi-step counters are located at the four corners of the frame, and the five remaining counters are all of mechanically-identical construction such as is shown in Fig. 14 and which I will now describe.

Each of the four wheels 50, carries, in a right-hand recess, a zeroizing pawl 51 having its nose spring-pressed through a notch 52ª in the wheel hub 52, and to the left side of the web of the wheel is staked a feed ratchet 53 having suitable teeth (ten in number, if the counter is intended for plain numerical counting) and having a deep notch 53ª positioned to receive the feed-pawl as the wheel turns to zero-indication. A detent-pawl 54 pressed by spring 54ª co-acts with the flats of the feed ratchet 53 to prevent accidental displacement of any wheel, such detents for the forward and middle rows of counters being pivoted on cross shafts 55, and those for the rear row on a split shaft 55, 55′, (Fig. 23), which is divided to make room for the gear mechanism of counter X, to be described. Conveniently the right-hand section 55 of this split shaft may be mounted in the ears 56′ of a sub-frame 56 (Figs. 18 and 23) that is of yoke-shaped in plan and conveniently mounted on suitable cross rods and shafts of the frame, while sections 55′ is secured to the left side plate.

The single-step counter may receive primary-wheel feed and carrying feed from a single pawl structure. It has, at its right side, a rocking feed plate 57 carrying a stud 57ˣ with which the notched extremity of the single-step indexing-bar 10′ makes engagement, said stud being also engaged by the spring 10′ which thereby serves to tension both the slide bar structure and the feed plate. On the left face of this plate 57 is mounted a feed pawl structure 58, having its active end pressed, by the plate-carrier spring 58ª, toward the feed ratchets 53. As shown in Fig. 24 the end members of the yoke-formed sheet-metal piece constituting the feed pawl body provide two of the teeth 59 for the four ratchets and an attached yoke-shaped piece 60 provides the intermediate two teeth. These teeth 59 are progressively shorter from right to left, so that only when the longest tooth 59, (for the ratchet of the dial wheel of lowest order) drops in a deep notch 53ª (as shown in counter Q, Fig. 16) can the pawl tooth for the wheel of next higher order engage a tooth of its ratchet 53, and so on across the series.

Now it will be apparent that the single step fore-and-aft vibration of an actuating slide structure associated with one of these single step counters will feed it forward a step at a time, the carry from wheel to wheel occurring accordantly with the arrangement of the deep notches 53ª.

For each of the multi-step actuating-slide structures the counter is equipped as shown in Fig. 13, so that the feed for the wheel of lowest order and the carry-feed for higher order wheels are imparted by different pawl-mechanisms. The lowest order wheel 50′ is fed from a disk 61 at the right end of the counter, said disk being gear-driven from the corresponding indexing bar 10, the retracting spring 11′ for which is conveniently connected to the head of the corresponding actuator bar 11 and to a crossplate of the selector section. Only the carrying pawls for the higher-order wheels 50 are mounted on the rocking feed plate 57′ which in this instance is arranged at the left end of the counter, setting or "cocking" of the carrying pawls being controlled from the lowest-order dial wheel 50′ when turning from "9" to "0", but their carrying actuation being subsequently effected, non-concurrently with the movement of the wheel 50′ from "9" to "0".

Each feed disk 61 has a spur gear 62 staked to it, and with respect to three of the counters D, P and H this gear directly engages a rack 63 formed in the appropriate indexing bar 10; but with respect to the counter X, in order to decrease the necessary range of motion of the actuator-bar 11ˣ, the connection between gear 62′ and rack 63′ is made through intervening reducing gearing 65, the arbor for which may be supported between the left side frame 5ᵈ and the sub-frame 56. Otherwise the X counter is mechanically identical with the other multi-step counters. On its left side the feed disk 61 carries a spring-pressed feed pawl 66 (Fig. 31) to coact with a feed ratchet 67 that is staked by pin 67′ (passing through intervening cam disk 73 to be described) to the web-wall of the modified wheel 50′ of the lowest order. It is for this reason that, as shown in Fig. 27, wheel 50′ has on its left side its recess 52ª for the zeroizing pawl 51′ that is carried by a ratchet 53′ (Fig. 23) fast on the properly elongated hub 52′ of wheel 50′.

From the foregoing it will be apparent that as a rack-equipped indexing bar is reciprocated to the extent of one or more steps it correspondingly rocks the feed disk 61 geared thereto, the retracting motion of the bar (concurrent with the handle E forward stroke) drawing feed pawl idly over ratchet 67, and advancement of the actuator structure (concurrent with return of handle E) causing the feed pawl 66 to push the ratchet 67, and the lowest order dial wheel 50′ that is staked thereto, forward the accordant number of steps. But if the stated traverse of the dial wheel 50′ is to (or past) zero-position there is no carry effected, but rather a cocking of the carry-pawl.

The feed plate 57′ carries the pawl structure 58′ for carry effectuation, and this pawl may be identical with pawl 58 heretofore described except that it has only three teeth 59′, the right-hand one of the teeth 59 being cut away completely. To normally lock the rocking carry-plate 57' against the tension of its spring 69 I provide a two-armed lever 70, yoke-shaped in plan, pivoted on a suitable shaft (55 or 55') with its locking arm 71 provided with an upwardly curved nose the extremity 71' of which latches a lug 57ᵃ formed on the feed plate 57' but releases the latter when the lever 70 is rocked. The other limb 72 of the lever, normally raised by spring 72' has a cam 72ᵃ at its end interposed at the path of movement of the short cam 73ᵃ of a disk 73 that is staked (by pin 67') to the first index wheel 50', the arrangement being such that cam 73ᵃ co-acts with cam 72ᵃ to rock the lever 70 and free the carry feed plate 57' as the lowest-order wheel 50' moves through its last step to zero-indication. The co-acting curve of the lever arm 71 and end of stop lug 57ᵃ are so shaped that when the released feed-plate is swung down by its spring 69, the lug 57ᵃ holds the lever 70 depressed or cocked pending restoration of the feed plate to normal position and the consequent carry-advancement of one or more of the dial wheels 50.

To effect the last stated restoration and feeding movement of the plate 57' it has an elongated stud 75 (to which spring 69 may incidentally connect) disposed in the path of movement of a restoring lever 76, the four such levers being fast on two cross-shafts 77 having respective lower cranks 78 that are connected to a longitudinally extending link 79 running close along the left side of the counter frame, the link being normally drawn forward by a spring 79'; movement of the link from normal position (Fig. 15) to retracted position (Fig. 17) restores feed plate 57' to be relatched in normal position by lever 70. The forward end of this link 79 is demountably secured to a crank 80 on a short cross shaft 81 that is supported (Fig. 3) in the filler-yoke 43 and that has a second depending crank arm 80' pivotally receiving a link 79ᵃ. The rear end of link 79ᵃ is connected to the vertically depending lower arm of a bell crank lever 82, the forwardly extending horizontal arm of which carries a roller stud 82' in the path of movement of a cam-ended finger 83 that is knuckle-jointed to the down-turned arm 9' of the operating lever 9. During each down-swing of lever arm 9' the bell crank lever 82 is rocked and sharply retracts the link-system and then as its pin 82' escapes from the finger 83 the link-system is spring-restored. Therefore, after the last item to be segregated has been set up and the adding machine handle operated, it is always desirable to give the link 79 one more reciprocation to complete any carries that may be latent in the multi-step counter mechanism, and this may be done either by giving the adding machine handle E an extra reciprocation or by rocking the finger lever 85 that protrudes through the top of the counter section. This lever 85 is pivoted to the inner face of the side plate 5ᵉ, normally retracted by spring 85' and has its lower end arranged to engage the stud 86 on the link 79, so that by drawing the finger piece forward one throws link 79 rearward and effects the restoring stroke of the connection levers 76.

While the dial wheels above described read numerically, registration may be made in values—for example, to show $40.00 on the $2.00-counter, II' rather than the number "20". Only the nickels, quarters, halves, two and fives counters, (N', Q', H', II', V') need be modified, and these only to the extent of revising the figures on their rims, changing the carry-points accordingly, and in one instance changing the number of ratchet teeth. Thus (Fig. 35) the nickels, halves and fives wheels of lowest order will show "5" and "0" alternately and the 10-toothed ratchets will have five deep notches; the $2.00-counter (Fig. 36) will have its first wheel read 0-2-4-6-8-and-repeat, and its cam-disk 73 will have two cams 73ᵃ, while (Fig. 37) the quarters wheel will have numbering 00-25-50-75-and-repeat, its ratchet 53 having only eight teeth and two deep notches. To supply fixed indicia where desirable, for this value-reading display, a "0" is stamped, or otherwise displayed immediately to the right of the sight opening and in line to be read with the dial members, for the tens, halves and dimes counters, and the decimal points of the counters P', N', D', Q', H', and the thousands-points of the counters I', II', V', X', are marked at the upper edge of the respective sight openings, all as shown in Fig. 38.

For convenience in zeroizing the finger lever 85 may also be employed to work an overthrow-preventing mechanism to keep any shaft from being turned back by means of its twirling knob 48, past zero position. Each shaft 46 projects slightly beyond the left-hand frame member 5ᵈ, and on the outside of said frame three over-throw pawls 90 for engagement in the shaft notches 47 when properly positioned by lever 85. These pawls 90 are pivoted on a strip 91 which is normally maintained at an elevation (Fig. 21) that holds the pawls away from the notched shaft, but which is depressible by lever 85. Each pawl has a pivoted lost-motion connection 90ᵃ with the strip and is drawn forward and downward by a spring 91ᵃ hooked to the strip and to a pawl stud 90ᵇ that also co-acts with the upper edge of the strip as a limitation stop for the pawl. The strip 91 has a vertical slot and pin connection 92 with the side frame, the two pins 92 serving also as a fulcra for bell crank levers 92ᵃ that make pin and slot engagement 92ᵇ with strip 91 and that have their verticallypendent arms connected by a link 93 which is normally held by spring 93′, in advanced position so as to elevate the strip 91. On lever 85 is a stud 85ᵃ that passes through a suitable slot in the side plate 5ᵈ to co-act with a lug 93ᵃ on the link 93 so that by rocking the lever 85 one depresses the pawl-strip. It will be seen (right end of Fig. 21) that each pawl 90 stands normally somewhat in advance of direct alignment with the shoulder of shaft-notch 47, so that when the strip 91 is depressed the pawl does not drop into the shaft notch but lands just ahead of it, leaving the shaft free to be turned backward (counter-clockwise) by the twirling-knob 48 through substantially a complete rotation before the shoulder 47 of the shaft picks up the pawl 90 and forces it back in its pivot-slot, against the tension of its light spring 91ᵃ, to the position shown at the right of Fig. 22, the tension of spring 91ᵃ being too light to overcome the positioning influence of the detent 49ᵇ (heretofore described) for the shaft.

*Operating lever connection.*

While the construction for working a bail, as 12, from an actuating lever, as 9, and for vibrating such lever 9 from the adding machine handle E, yet making it readily detachable from operative connection with said handle, may be varied, I prefer the organization shown in Figs. 19 and 20. To a crank lug e on the operating handle E is pivotally latched link 94 having a pin 94′ making permanent engagement with a two-position guiding link 95 and detachable engagement with a notch in the end of the lever 9.

The operating lever has two arms (9, 9′) united through the rock shaft 9ᵃ, the former, located at the right, being prolonged through a casing-slot to hook onto link-pin 94′, and the latter, located at the left, carrying the finger 83. These two arms, passing the sides of the yoke-shaped bail 12 have cam-slots 9ᵇ to engage the bail-pins 12ᵇ so that movement of lever 9 from lowest position shown in Fig. 19, to the raised position of the guide link 95 will fully retract the bail.

The guide link 95 guides the vertical link 94 when the latter is disconnected from the lever 9, and is shiftable to effect connection or disconnection of said parts, its shifting movements incidentally controlling a latch for the lever 9. Thus, link 95 has a dumb-bell slot 95ᵃ by which it may pivot in either of two longitudinal positions on the rock shaft 9ᵃ, and also it has a broadened portion having an arc-and-radius slot 95ᵇ engaging a pin 9ᶜ on the lever 9, said slot is so shaped that, when the link 95 is pulled forward to the position shown in Fig. 19 it throws the pin 94′ beyond the notched end of lever 9, while, when the link 95 is depressed and pushed forward, the pin 9ᶜ will enter the radial upper leg of slot 95ᵇ and pin 94′ will engage the notch in the lever 9, the guide link 95 then pivoting at the rightward end of its slot 95ᵃ. When the guide link is thus thrown forward a stud 95ᶜ thereon throws back the spring pressed latch 96 that is pivoted to side-plate 4ᵉ to engage pin 96′ of the operating lever 9 and latch the latter in normal depressed position. When in active or leftward position the guide link should be held there with sufficient strength, by spring 95ᵈ, to overcome the slight rearward pressure of the spring pressed latch 96 against pin 95ᵉ, the spring 95ᵈ being assisted in this respect by the dumb-bell shaped slot 95ᵃ which acts to retain the link 95 in either of its two external positions.

While I have above described the segregator as an attachment for an adding machine, its conversion into a self-contained machine, as illustrated in Fig. 34, involves only the mounting of the operating handle E′ on the suitably-modified, self-supporting frame of the machine with the handle-extension e′ slot-controlling the pin 94′; and additionally the incorporation of key-restoring- and-latching mechanism G′ (of suitable, known construction) in connection with the the key-stem system.

*Operation.*

In résumé of the operation of the machine: The operating lever 9 of the segregator may be hooked to connector 94 of the adding machine handle E (Fig. 2) or the guide link 95 for said connector may be moved to position shown in Fig. 17 to free the connector from the actuating lever 9, which may then be latched down by the dog 96. Each out-stroke of the handle E causes the actuating lever 9, (if connected thereto,) to retract the bail 12, which will be followed rearward by all of the spring-pressed selectively-released segregator-actuating-bars 11 that stand free or released at the time and such outstroke of lever E also causes the knuckle-finger 83 (Fig. 2) to work the train of mechanism that completely vibrates the linkage system 79ᵃ, 79 which extends forward into the counter section.

When any segregator key is depressed its stem 7 rocks such latch-shutters (15 to 21 and 23) as it controls, thereby moving shutter fingers 13 or 13′ to unlatch those actuator bars 11 that are controlled by the respective shutters. The unlatched bars include (at least) all that are connected with counters representing currency pieces making up, with the fewest pieces, the amount indicated on the key. In some instances where the actuator bar 11 is of necessity subject to multi-step movement, (e. g., the bar 11ᵖ for the pennies counter P,) lugs 24 on the key-stems, entering notches 25 in the tops of the actuating bars, determine the permissive extent of movement of the actuator-bar accordantly with the requirement of the particular key depressed. This does not hold good, however, as to any tens of cents key, which has no stop lug directly acting on the dimes actuator bar 11$^d$ because the number of dimes to be registered,—whether one or two,—will sometimes depend upon which U. C. (units of cents) key may be depressed. To take care of this condition, and in general to handle the permutations between the registrations of quarters, dimes and nickels that are involved in making different combinations between the T. C. (tens of cents) keys and the U. C. keys, each T. C. key when depressed lowers its associated permutation stop 30 to a first stage position in which said stop, co-operating with the upper-stage notching 25$^a$ of the nickels, dimes and quarters bars, 11$^n$, 11$^d$ and 11$^q$, releases only those bars which will register the value of said T. C. key standing alone, but such permutation stop is further lowered to a second-stage position by the operation of any U. C. key (specifically keys "5" to "9") that may necessitate a permutation, and in such second stage position the permutation stop locks such previously-free actuator bars, and (through its clearance slot) frees such previously-locked actuator bars, as may result in the requisite registration of the smallest number of currency pieces that will make up the value set up by depression of the two keys. All actuator bars that are finally freed by the key stem set-up are spring-retracted when the bail 12 is retracted and restored to normal position when the bail is restored, so working their respective counters.

In the counter section, where the actuator bars 11 find substantial extension in the respective indexing bars 10, the vibration of an indexing bar results in advancement of the dial wheel of lowest order in the corresponding counter. As to counters (Fig. 14) having invariably a single step operation this is done by direct connection of the indexing bar 10 to a feed plate 57 that carries the pawl 59 for all the dial wheels. In counters having multi-step movement Fig. 13 it is done by gearing a rack on the indexing bar to a feed-plate 61 that carries the feed pawl for the lowest-order wheel. In the single step counters (Fig. 14) carrying operations are concurrent with the first-wheel operation through a common pawl 58. In the gear driven, multi-step counters, the gear-carried feed-disk 61 has only a pawl for the lowest order wheel 51, while a lug 71$^a$ carried in rotation by that wheel controls the "carry". Such lug works one arm 72 of a latch-lever 70 to throw its other latching arm 71 to position to release a spring-pressed feed plate 57′ on which is mounted the carrying-pawl structure 58′ for the higher-order wheels. Thus the actuation of the lowest-order wheel from "9" indication to "0" indication merely "cocks" the carrying pawl 58′ by freeing plate 57′ for spring-impelled depression, so that the plate stands ready to complete the carrying-operation when the link 79 that controls the feed-plate restoring lever 76 is vibrated, thereby to force the cocked feed-plate 57′ back to initial position. This link system 79, 79$^a$ is fully vibrated, as above stated, during the first half-stroke of the adding machine handle E, so that the carry, on these multi-step counters, is not completed until the next-succeeding operating-stroke, or an idle stroke, of the adding machine handle. Further, however, the carry may be completed by the vibration of finger lever 85 that has connections directly to vibrate the link system 79, 79$^a$.

The counters shown in the principal views are intended for numerical recording of the quantity of currency pieces of each denomination, requisite to make up the listed items, but as illustrated in Fig. 35 the counters may easily be made to read in terms of value, e. g., to show on the nickels counter the value "$1.20" instead of the number "24".

In proving the correctness of the segregator totals, one operates the adding machine to list the items-total for reference and to clear the adding machine dials, after which the actuating lever 9 is disconnected from the adding-machine handle E and the indications on the separate counters of the segregator (read as or converted to decimal money-values) are successively set up on the adding machine keyboard without removing the segregator. It is for this purpose that the three extra banks of keys at the left of the segregator are provided. Of course when the nine items thus taken from the segregator-counters are totalized on the adding machine, the two-listed totals should be equal.

The segregator is zeroized by twirling each of the counter shafts forwardly by the twirling knob 48 through one full revolution, the shouldered shaft notches 47 picking up the zeroizing pawls of all of the dial wheels on the shaft. In this operation the finger lever 85 should be pressed forwardly, lowering the strip 91 for the over-throw preventing pawls 90 (Figs. 21 and 22) to position for engagement with the shaft-notches 47, each such pawl being mounted to slip slightly in its pivot-slot after it engages the shaft-shoulder, so that when the strip 91 is again raised (by release of lever 85) the pawls 90 spring-pressed back to the initial position in their pivot slots, are positioned a little in advance of shaft-notch shoulders 47 and will not prevent the next zeroizing operation when again depressed. Normally all counter shafts are held against accidental movement by friction detents.

The provision for latching the operating lever 9 when it is disengaged from the link 94 is effective in preventing false setting of any actuator bar when the segregator is being removed from the adding machine and the construction of the rear guide plates for the actuator bars, with the upper one thereof (4ᵉ) flanged insures smooth working of the sliding bar actuator-system and prevents the rear notches 14 from accidently engaging the rear spacing plate 4ᶠ.

While I have herein described in some detail a particular embodiment of my invention, it will be apparent that many changes in construction may be made without departure from the spirit of my invention, within the scope of the appended claims.

I claim:

1. In a segregator, respective counters for different currency values; respective actuators therefor; latching shutters for the actuators, means for moving the actuators when unrestrained; and keys arranged for setting up values in bookkeeping terms, having their stems arranged for engagement with appropriate ones of, and selectively controlling, the shutters.

2. In a segregator, respective counters for different currency values; respective actuators therefor; latching shutters pivotally mounted parallel with the actuators for normally restraining them; means for moving the actuators when unrestrained; and keys arranged for setting up values in bookkeeping terms, having their stems arranged alongside of and for engagement with appropriate ones of, and selectively controlling, the shutters.

3. In a segregator, respective counters for different currency values; respective actuators therefor each normally spring-pressed in one direction; latching shutters for normally restraining the actuators against spring-impelled movement; keys arranged for the setting up of values in bookkeeping terms and having their stems arranged for engagement with appropriate ones of, and selectively controlling, the shutters; and means for restoring the actuators after their spring-impelled movement.

4. In a segregator, respective counters for different currency values; respective slidable actuators therefor each normally spring-pressed in one direction; pivoted latching shutters paralleling the sliding actuators and normally restraining the actuators against spring-impelled movement; keys, in arrangement for the setting up of values in bookkeeping terms, having their stems arranged for engagement with appropriate ones of, and selectively controlling, the shutters; and means common to all the actuators for restoring any thereof after its spring-impelled movement.

5. In a segregator, respective counters for different currency values; respective slidable actuators therefor each normally spring-pressed in one direction; pivoted latching shutters for normally restraining the actuators against spring-impelled movement; keys having their stems arranged for engagement with appropriate ones of, and selectively controlling, the shutters, arranged in banks that parallel the shutters and bearing indicia for the setting up of values in bookkeeping terms; and means common to all of the actuators for restoring any thereof after a spring impelled movement.

6. In a segregator, respective counters for different currency values; respective actuators therefor; two-position latching shutters for the actuators each normally positioned in actuator-restraining position and key-movable to actuator-releasing position, means for operating the actuators that are unrestrained; keys, numbered 1 to 9 only, arranged in decimal banks, each key controlling the unlatching of the shutter or shutters for the actuator or actuators requisite to be moved for registration in currency-terms of the decimal value expressed by said key and some of said shutters controlling actuators not necessary to registration of some of said key-expressed values; and means controlled by some of the keys for locking against movement each actuator unlatched by said key that is not requisite for the registration aforesaid.

7. In a segregator, respective counters for different currency values; respective actuators therefor; latching shutters for normally restraining the actuators; means for operating the actuators that are unrestrained; keys, numbered 1 to 9 only, arranged in decimal banks, each key controlling the unlatching of the shutter or shutters for the actuator or actuators requisite to be moved for registration in currency-terms of the decimal value expressed by said key and some of said shutters controlling actuators not necessary to registration of some of said key-expressed values; and means controlled by some of the keys for locking against movement each actuator unlatched by said key that is not requisite for the registration aforesaid, said means including key-carried stop-parts co-acting with stop-parts of the actuators.

8. In a segregator, respective counters for different currency values; respective actuators therefor; latching shutters for normally restraining the actuators; means for operating the actuators that are unrestrained; keys, numbered 1 to 9 only, arranged in decimal banks, each key controlling the unlatching of the shutter or shutters for the actuator or actuators requisite to be moved for registration as currency terms of the decimal value expressed by said key and some of said shutters controlling actuators not necessary to registration of some of said key expressed values; and means controlled by the keys for locking against movement each actuator unlatched by said key that is not requisite for the registration aforesaid, said means including permutation stops extending across a plurality of actuators for stopping co-action therewith.

9. In a segregator, a plurality of currency value counters; respective actuators associated therewith; latching means for said actuators; a plurality of banks of keys of different orders whereon values may be set up in bookkeeping terms, each key of each bank selectively controlling the appropriate latching means to unlatch all actuators that should move to register the amount indicated by that key alone; means controlled by certain of the keys of a lower-order bank and acting on the actuator for permuting the aggregate actuator-selection of upper- and lower-order keys to a joint selection for registering the value set up in fewest currency pieces; and means to operate the selected actuators.

10. In a segregator, a plurality of currency value counters; respective actuators associated therewith; two key-banks of higher and lower orders whereon values may be set up in bookkeeping terms; latching means for the actuators selectively controlled by the keys of said banks whereby each key may unlatch all actuators that should move to register the amount indicated on said key alone; permutation stops co-acting with certain of said actuators to disable or release them and controlled by certain keys of the higher-order bank to disable selected ones of the actuators, and means to operate the released actuators.

11. In a segregator, a plurality of currency value counters; respective actuators associated therewith, two key banks of higher and lower orders whereon values may be set up in bookkeeping terms, latching means for the actuators selectively controlled by the keys of said banks whereby each key may unlatch all actuators that should move to register the amount indicated on said key alone; permutation stops co-acting with certain of said actuators to disable or release them and controlled by certain keys of higher order selectively to disable selected ones of the actuators, and certain of said permutation stops also controlled by lower order keys to permute the individual actuator-selection of two keys of different orders into a joint selection for registration of the aggregate value expressed by said two keys in terms of fewest currency pieces.

12. In a segregator, a plurality of counters assigned to respective currency values; respective actuators for said counters; two-position latching means normally restraining said actuators, keys numbered 1 to 9 in banks representing respective decimal orders, the keys of each bank arranged and adapted to move appropriate latching means to releasing position to select all actuators which should move to register the amounts indicated on said keys, means for operating all actuators so selected, and means independent of said latching means and controlled jointly by keys of a higher and a lower order for permuting the actuator selections of individual keys of said orders to a joint selection of actuators to register the decimally-expressed set-up of two keys in terms of fewest currency pieces.

13. In a segregator, a decimal keyboard; with the "1" to "9" keys in banks; a plurality of counters assigned to different currency values, disposed in front of said keyboard; sliding actuators extending lengthwise of the key banks each associated with a respective counter, latching shutters extending along the rows of the key stems and controlling the unlatching of appropriate actuators; means for operating all released actuators; and permutation stops, operatively associated with the actuators selectively to free or lock the same in two stages of movement, said stops being controlled as to primary-stage movement by respective keys of higher order, and controlled as to further movement by certain keys of a lower order.

14. In a segregator; counters; notched actuator bars therefor, spring-pressed in one direction; an operating bail common to said actuators; latching shutters for said actuators; transversely arranged permutation stops having two stages of movement and at each stage controlling the freedom or otherwise of certain actuator bars; key banks of different orders, the keys of each bank controlling appropriate ones of the latching shutters and keys of a higher order bank controlling one stage of movement of said permutation stops while keys of another order control further movement of said permutation stops.

15. In a segregator, a plurality of currency value counters, respective actuators associated therewith, latch shutters normally restraining said actuator bars; means for operating freed actuators; keys arranged in parallel banks and controlling said latch shutters; permutation stops controlled by various keys of a higher order crossing and co-operating with a plurality of said actuators to control the freeing or stopping thereof, said permutation stops pivoted remotely from said keys of higher order; and a shutter further controlling the position of certain of said permutation stops and itself controlled by certain keys of a lower order.

16. In a segregator, the combination with an actuator and keys of differing denominational orders; of a permutation stop common to said keys for joint control by them, and capable of assuming different positions to free or to lock said actuator; and means controlled by said keys for selectively determining the positions to be assumed by said stop accordantly with the operation of different ones of said keys.

17. In a segregator, an actuator and a permutation stop relatively movable for co-operation in two different positions to free or lock the actuator; means to operate said actuator when freed; and two keys, one controlling relative movement of said stop to one position, the other controlling further movement of said stop to another position.

18. In a segregator, a selector frame; actuators extending therethrough spring-pressed in one direction; a common bail for said actuators for moving them in the other direction; latching shutters for said actuators pivoted longitudinally in the frame; longitudinal banks of key-stems controlling said shutters; a plurality of permutation stops for respective keys of a bank of higher order, each arranged for selective co-operation, in two stages of movement, with certain said actuator bars, the said bars having therein two stage notches to co-operate with said stops; each said stop being controlled as to its movement to one stage position by a corresponding higher-order key, and a shutter paralleling a lower-order key-bank controlling the movement of said permutation stops to a second-stage position, said shutter being controlled by keys of the lower order.

19. In a segregator, the combination of a plurality of actuators, means to reciprocate them when freed, latching shutters for said actuators, and controlling keys for said shutters, certain of said actuators having provision in two separated stages for co-action with permutation-stop means; and permutation-stops for selectively freeing or restraining said actuators, each stop controlled by a key of one order for assumption of position to co-act with the first-stage provision of the affected actuator bars, and controlled by keys of another order for assumption of position to co-act with the second-stage provision of said actuator bars.

20. In a segregator, a plurality of actuator bars arranged side by side and each notched, at several stations along its length, in upper and lower stages; means for reciprocating said bars, means for normally latching said bars, keys arranged in banks for controlling said latch-means and in sequence appropriate to the notch-stations of the actuators; pivoted permutation stops transversely disposed with respect to certain said actuator bars and each stop movable to two positions for co-operation respectively with the upper and lower stage notches at the corresponding station on said bars, each said stop being controlled for assumption of one position by a respective key of one bank, and controlled for further assumption of another position by a plurality of keys of another bank.

21. In a segregator, the combination of units-of-cents keys, tens-of-cents keys, counters for nickels, dimes and quarters, actuators for said counters, each having an edge notched at various stations in two stages, latching means for said actuators controlled by the keys, operating means for said actuators, permutation stops co-acting with and normally disabled by respective keys of the tens-of-cent bank and pivotally mounted for movement of two stages to co-operate with the respective upper- and lower-stage notches of the actuators, and a pivoted shutter controlling movement of said permutation stops to lower stage position, said shutter controlled by certain keys of the units-of-cents bank.

22. In a segregator-attachment for an adding machine that has an operating handle, a keyboard, actuator bars, selective mechanism to free certain actuator bars accordantly with the key set-up, counter mechanism associated with said actuator bars, operating means for the freed actuator bars including an operating lever, a connector from the adding machine handle connectible with said operating lever, and a swinging guide link for said connector pivoted thereto and arranged and adapted to permit movement of said connector to and from operating-lever-engaging position.

23. In a segregator attachment for an adding machine that has an operating handle, counters assigned to currency values, respective actuators therefor, keys selectively controlling the freeing of said actuators, an operating lever for the selected actuators, a guide link movable to two positions with respect to said operating lever and in one said position movable with said operating lever, a connector pivoted to the adding-machine handle and to the guide link and having provision for engagement, in one position only of said guide-link, with the operating lever aforesaid.

24. In a segregator attachment for an adding machine that has an operating handle, counters assigned to currency values, respective actuators therefor, keys selectively controlling the freeing of said actuators, an operating lever for the selected actuators, a guide link movable to two positions with respect to said operating lever and in one said position movable with said operating lever, a connector pivoted to the adding machine handle and to the guide link and having provision for engagement, in one position only of said guide link, with the operating lever aforesaid, and latching means for co-operating with said operating lever when it is disengaged from the connector.

25. In a segregator attachment for an adding machine that has an operating handle, counters assigned to currency values, respective actuators therefor, keys selectively controlling the freeing of said actuators, an operating lever for the selected actuators, a guide link movable to two positions with respect to said operating lever and in one said position movable with said operating lever, a connector pivoted to the adding machine handle and to the guide link and having provision for engagement, in one position only of said guide link, with the operating lever aforesaid, and latching means for co-operating with said operating lever and governed by the guide link.

26. In a segregator attachment for an adding machine that has an operating handle, counters assigned to currency values, respective actuators therefor, keys selectively controlling the freeing of said actuators, an operating lever for the selected actuators, a guide link movable to two positions with respect to said operating lever and in one said position movable with said operating lever, a connector pivoted to the adding machine handle and to the guide link and having provision for engagement, in one position only of said guide link, with the operating lever aforesaid, and latching means for said operating lever disposed to act thereon only when the operating lever is freed from the connector and the guide link is out of normal or idle position, the latch being otherwise rendered inactive by co-operation with the guide-link.

27. In a segregator, a plurality of parallel counter-shafts, a plurality of counters on each shaft the dial wheels of said counters having zeroizing pawls to co-act with said respective shafts, and an overthrow-preventing system comprising a normally inactive pawl for each shaft and means for simultaneously moving all said pawls to active position.

28. In a segregator for attachment to an adding machine that has an operating handle, a frame, a keyboard having keystems extending through the frame for co-action with corresponding adding machine keys, a plurality of currency counters, means associated with said keystems of lower-orders selectively to condition said counters for actuation, and an operating lever for actuating said counters connectible with the operating handle of the adding machine, said segregator keyboard including keys of higher order than those controlling the counter-selection.

29. The combination with a calculating machine having a keyboard, of an auxiliary keyboard operatively associated with the keys of said keyboard of the calculating machine so as to be movable therewith, registers for different monetary denominations, register actuating slides mounted upon the auxiliary keyboard and means controlled by the auxiliary keyboard for permitting differential movements of selected slides to analyze any sum charged into the machine through the keyboard into the smaller denominations of which it is composed and register proper amounts upon the different denomination registers.

30. A denominating attachment for adding machines for scheduling the different denominations of money required to make up different amounts accumulated in the adding machine, consisting of a unit adapted to be disposed entirely upon the keyboard of an adding machine, the said unit including a keyboard comprising keys, a plurality of denominating registers controlled by said keys and carried by said attachment keyboard, actuating devices for said denominating registers carried by said attachment keyboard, and an operating mechanism for the actuating devices aforesaid comprising means to connect it up with the operating means of an adding machine, said actuating devices being under the selecting control of the keys.

31. A denominator including a keyboard having a units column of keys and a tens column of keys, a penny slide and a nickel slide associated with the units column of keys, nickel, dime, quarter and half dollar slides associated with the tens column of keys, corresponding denomination registers arranged to be actuated by the corresponding slides, and means controlled by the keys for permitting differential movements of selected slides to actuate the registers according to the denominations of which the amount set up on the keyboard is composed.

JOHN MAGNUS.